US012536958B2

(12) United States Patent
Lu et al.

(10) Patent No.: US 12,536,958 B2
(45) Date of Patent: Jan. 27, 2026

(54) ARRAY SUBSTRATE AND DISPLAY APPARATUS

(71) Applicant: BOE Technology Group Co., Ltd., Beijing (CN)

(72) Inventors: Jiangnan Lu, Beijing (CN); Tian Dong, Beijing (CN); Xuliang Zhao, Beijing (CN); Libin Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 58 days.

(21) Appl. No.: 18/689,408

(22) PCT Filed: Apr. 28, 2023

(86) PCT No.: PCT/CN2023/091455
§ 371 (c)(1),
(2) Date: Mar. 5, 2024

(87) PCT Pub. No.: WO2024/221379
PCT Pub. Date: Oct. 31, 2024

(65) Prior Publication Data
US 2025/0225930 A1 Jul. 10, 2025

(51) Int. Cl.
*G09G 3/3233* (2016.01)

(52) U.S. Cl.
CPC ... *G09G 3/3233* (2013.01); *G09G 2300/0408* (2013.01); *G09G 2300/0426* (2013.01); *G09G 2310/061* (2013.01); *G09G 2310/08* (2013.01)

(58) Field of Classification Search
CPC ......... G09G 3/3233; G09G 2300/0408; G09G 2300/0426; G09G 2310/061; G09G 2310/08
See application file for complete search history.

(56) References Cited

U.S. PATENT DOCUMENTS

2006/0044241 A1* 3/2006 Yuh-Ren .............. G09G 3/3648 345/89
2006/0044292 A1* 3/2006 Shen .................... G09G 3/3659 345/204
(Continued)

FOREIGN PATENT DOCUMENTS

CN 112365831 A 2/2021
CN 114255703 A 3/2022
(Continued)

OTHER PUBLICATIONS

International Search Report & Written Opinion mailed M, regarding PCT/CN2023/091455.

*Primary Examiner* — Dmitriy Bolotin
(74) *Attorney, Agent, or Firm* — Intellectual Valley Law, P.C.

(57) ABSTRACT

An array substrate includes a first respective data line configured to provide data signals to first electrodes of data write transistors in a same column of pixel driving circuits and in a first row of two adjacent rows of pixel driving circuits; and a second respective data line configured to provide data signals to first electrodes of data write transistors in the same column and in a second row of the two adjacent rows of pixel driving circuits. The first respective data line and the second respective data line at least partially extend in the same column. The first respective data line is electrically isolated from the first electrodes of the data write transistors in the same column and in the second row. The second respective data line is electrically isolated from the first electrodes of the data write transistors in the same column and in the first row.

19 Claims, 23 Drawing Sheets

(56) References Cited

U.S. PATENT DOCUMENTS

| | | | | |
|---|---|---|---|---|
| 2009/0189881 | A1* | 7/2009 | Ooishi | G09G 3/20 345/55 |
| 2017/0141177 | A1* | 5/2017 | Kim | G09G 3/3291 |
| 2020/0184900 | A1* | 6/2020 | Shin | G09G 3/3233 |
| 2022/0208927 | A1 | 6/2022 | Yang et al. | |
| 2022/0310751 | A1* | 9/2022 | Shang | H10K 59/131 |
| 2022/0319422 | A1 | 10/2022 | Li | |
| 2023/0095733 | A1 | 3/2023 | Yuan et al. | |

FOREIGN PATENT DOCUMENTS

| | | | |
|---|---|---|---|
| WO | 2023039830 | A1 | 3/2023 |
| WO | 2023039842 | A1 | 3/2023 |

* cited by examiner

ARRAY SUBSTRATE AND DISPLAY APPARATUS

CROSS-REFERENCE TO RELATED APPLICATION

This application is a national stage application under 35 U.S.C. § 371 of International Application No. PCT/CN2023/091455, filed Apr. 28, 2023, the contents of which are incorporated by reference in the entirety.

TECHNICAL FIELD

The present invention relates to display technology, more particularly, to an array substrate and a display apparatus.

BACKGROUND

Organic Light Emitting Diode (OLED) display is one of the hotspots in the field of flat panel display research today. Unlike Thin Film Transistor-Liquid Crystal Display (TFT-LCD), which uses a stable voltage to control brightness, OLED is driven by a driving current required to be kept constant to control illumination. The OLED display panel includes a plurality of pixel units configured with pixel-driving circuits arranged in multiple rows and columns. Each pixel-driving circuit includes a driving transistor having a gate terminal connected to one gate line per row and a drain terminal connected to one data line per column. When the row in which the pixel unit is gated is turned on, the switching transistor connected to the driving transistor is turned on, and the data voltage is applied from the data line to the driving transistor via the switching transistor, so that the driving transistor outputs a current corresponding to the data voltage to an OLED device. The OLED device is driven to emit light of a corresponding brightness.

SUMMARY

In one aspect, the present disclosure provides an array substrate, comprising a plurality of data lines; wherein the plurality of data lines comprise a first respective data line configured to provide data signals to first electrodes of data write transistors in a same column of pixel driving circuits and in a first row of two adjacent rows of pixel driving circuits; and a second respective data line configured to provide data signals to first electrodes of data write transistors in the same column of pixel driving circuits and in a second row of the two adjacent rows of pixel driving circuits; the first respective data line and the second respective data line at least partially extend in the same column; the first respective data line is electrically isolated from the first electrodes of the data write transistors in the same column of pixel driving circuits and in the second row of the two adjacent rows of pixel driving circuits; and the second respective data line is electrically isolated from the first electrodes of the data write transistors in the same column of pixel driving circuits and in the first row of the two adjacent rows of pixel driving circuits.

Optionally, an orthographic projection of a same pixel driving circuit on a base substrate partially overlaps with an orthographic projection of the first respective data line on the base substrate, and partially overlaps with an orthographic projection of the second respective data line on the base substrate.

Optionally, an orthographic projection of the first respective data line on a base substrate partially overlaps with a first electrode of a driving transistor on the base substrate; and an orthographic projection of the second respective data line on the base substrate partially overlaps with a second electrode of the driving transistor on the base substrate.

Optionally, the array substrate further comprises a plurality of first data signal connecting pads and a plurality of second data signal connecting pads in the same column of pixel driving circuits; a respective first data signal connecting pad of the plurality of first data signal connecting pads connects the first respective data line with a first electrode of a data write transistor in a first respective pixel driving circuit in the first row of the two adjacent rows of pixel driving circuits; a respective second data signal connecting pad of the plurality of second data signal connecting pads connects the second respective data line with a first electrode of a data write transistor in a second respective pixel driving circuit in the second row of the two adjacent rows of pixel driving circuits; the plurality of first data signal connecting pads are absent in the first row of the two adjacent rows of pixel driving circuits; and the plurality of second data signal connecting pads are absent in the second row of the two adjacent rows of pixel driving circuits.

Optionally, a ratio of a total number of data lines to a total number of columns of pixel driving circuits in the array substrate is in a range of 1.6:1 to 2.4:1.

Optionally, the array substrate further comprises a plurality of third reset signal lines and a plurality of fourth reset signal lines; wherein a first adjacent third reset signal line of the plurality of third reset signal lines is configured to provide reset signals to first electrodes of first reset transistors respectively in two adjacent pixel driving circuits in a first row of two adjacent rows of pixel driving circuits, and in a first column and a second column of two adjacent columns of pixel driving circuits, respectively; a first adjacent fourth reset signal line of the plurality of fourth reset signal lines is configured to provide reset signals to first electrodes of second reset transistors respectively in the two adjacent pixel driving circuits in the first row of two adjacent rows of pixel driving circuits, and in the first column and the second column of the two adjacent columns of pixel driving circuits, respectively; a second adjacent third reset signal line of the plurality of third reset signal lines is configured to provide reset signals to first electrodes of first reset transistors respectively in two adjacent pixel driving circuits in the first row of the two adjacent rows of pixel driving circuits, and in a third column and a fourth column of two adjacent columns of pixel driving circuits, respectively; a second adjacent fourth reset signal line of the plurality of fourth reset signal lines is configured to provide reset signals to first electrodes of second reset transistors respectively in the two adjacent pixel driving circuits in the first row of the two adjacent rows of pixel driving circuits, and in the third column and the fourth column of the two adjacent columns of pixel driving circuits, respectively; the second adjacent third reset signal line of the plurality of third reset signal lines is configured to provide reset signals to first electrodes of first reset transistors respectively in two adjacent pixel driving circuits in a second row of the two adjacent rows of pixel driving circuits, and in the second column and the third column of two adjacent columns of pixel driving circuits, respectively; and the first adjacent fourth reset signal line of the plurality of fourth reset signal lines is configured to provide reset signals to first electrodes of second reset transistors respectively in the two adjacent pixel driving circuits in the second row of two adjacent rows of pixel driving circuits, and in the second column and the third column of the two adjacent columns of pixel driving circuits, respectively.

Optionally, the first adjacent third reset signal line at least partially extends in the first column of the two adjacent columns of pixel driving circuits; the first adjacent fourth reset signal line at least partially extends in the second column of the two adjacent columns of pixel driving circuits; the second adjacent third reset signal line at least partially extends in the third column of the two adjacent columns of pixel driving circuits; the second adjacent fourth reset signal line at least partially extends in the fourth column of the two adjacent columns of pixel driving circuits; the first column, the second column, the third column, and the fourth column are sequentially arranged; and the first row and the second row are sequentially arranged.

Optionally, the array substrate further comprises pixel driving circuits arranged in K number of columns and M number of rows, K and M being positive integers; the array substrate includes K number of reset signal lines configured to provide reset signals to reset transistors in of the array substrate; the K number of columns comprise a (4k-3)-th column of the K columns, a (4k-2)-th column of the K columns, a (4k-1)-th column of the K columns, and a 4k-th column of the K columns, k being a positive integer, $1 \leq k \leq (K/4)$; the M number of rows comprise a (2m-1)-th row of the M rows, and a 2m-th row of the M rows, m being a positive integer, $1 \leq m \leq (M/2)$; and the K number of reset signal lines comprise a plurality of third reset signal lines in the (4k-3)-th column of the K columns, or in the (4k-1)-th column of the K columns; and a plurality of fourth reset signal lines in the (4k-2)-th column of the K columns, or in the 4k-th column of the K columns.

Optionally, the K number of reset signal lines comprise a first adjacent third reset signal line of the plurality of third reset signal lines configured to provide reset signals to first electrodes of first reset transistors respectively in two adjacent pixel driving circuits in the (2m-1)-th row of pixel driving circuits, and in the (4k-3)-th column and the (4k-2)-th column of pixel driving circuits, respectively; a first adjacent fourth reset signal line of the plurality of fourth reset signal lines configured to provide reset signals to first electrodes of second reset transistors respectively in the two adjacent pixel driving circuits in the (2m-1)-th row of pixel driving circuits, and in the (4k-3)-th column and the (4k-2)-th column of pixel driving circuits, respectively; a second adjacent third reset signal line of the plurality of third reset signal lines configured to provide reset signals to first electrodes of first reset transistors respectively in two adjacent pixel driving circuits in the (2m-1)-th row of pixel driving circuits, and in a (4k-1)-th column and a (4k)-th column of pixel driving circuits, respectively; and a second adjacent fourth reset signal line of the plurality of fourth reset signal lines configured to provide reset signals to first electrodes of second reset transistors respectively in the two adjacent pixel driving circuits in the (2m-1)-th row of pixel driving circuits, and in the (4k-1)-th column and the (4k)-th column of pixel driving circuits, respectively; wherein the second adjacent third reset signal line is configured to provide reset signals to first electrodes of first reset transistors respectively in two adjacent pixel driving circuits in a (2m)-th row of pixel driving circuits, and in the (4k-2)-th column and the (4k-1)-th column of pixel driving circuits, respectively; and the first adjacent fourth reset signal line is configured to provide reset signals to first electrodes of second reset transistors respectively in the two adjacent pixel driving circuits in the (2m)-th row of pixel driving circuits, and in the (4k-2)-th column and the (4k-1)-th column of pixel driving circuits, respectively.

Optionally, the first adjacent third reset signal line at least partially extends in the (4k-3)-th column of pixel driving circuits; the first adjacent fourth reset signal line at least partially extends in the (4k-2)-th column of pixel driving circuits; the second adjacent third reset signal line at least partially extends in the (4k-1)-th column of pixel driving circuits; and the second adjacent fourth reset signal line at least partially extends in the (4k)-th column of pixel driving circuits.

Optionally, the plurality of third voltage supply lines are absent in the (4k-2)-th column and the (4k)-th column; the plurality of fourth voltage supply lines are absent in the (4k-3)-th column and the (4k-1)-th column; the plurality of third voltage supply lines are present in the (4k-3)-th column or in the (4k-1)-th column; and the plurality of fourth voltage supply lines are present in the (4k-2)-th column or in the (4k)-th column.

Optionally, at least one corresponding layer of pixel driving circuits in the (4k-3)-th column and the (4k-2)-th column and at least one corresponding layer of pixel driving circuits in the (4k-1)-th column and the (4k)-th column in a same row or in same rows have a substantially mirror symmetry with respect to each other.

Optionally, first electrodes of first reset transistors in two adjacent pixel driving circuits in the (2m-1)-th row and in the (4k-3)-th column and the (4k-2)-th column, respectively, are parts of a first unitary structure; first electrodes of second reset transistors in the two adjacent pixel driving circuits in the (2m-1)-th row and in the (4k-3)-th column and the (4k-2)-th column, respectively, are parts of the first unitary structure; first electrodes of first reset transistors in two adjacent pixel driving circuits in the (2m-1)-th row and in the (4k-1)-th column and the (4k)-th column, respectively, are parts of a second unitary structure; first electrodes of second reset transistors in the two adjacent pixel driving circuits in the (2m-1)-th row R (2m-1) and in the (4k-1)-th column C(4k-1) and the (4k)-th column C(4k), respectively, are parts of the second unitary structure; first electrodes of first reset transistors in two adjacent pixel driving circuits in the (2m)-th row and in the (4k-2)-th column and the (4k-1)-th column, respectively, are parts of a third unitary structure; and first electrodes of second reset transistors in the two adjacent pixel driving circuits in the (2m)-th row and in the (4k-2)-th column and the (4k-1)-th column, respectively, are parts of the third unitary structure.

Optionally, active layers, at least portions of first electrodes, and at least portion of second electrodes of transistors of the two adjacent pixel driving circuits in the (2m-1)-th row and in the (4k-3)-th column and the (4k-2)-th column, respectively, are parts of a first unitary structure; active layers, at least portions of first electrodes, and at least portion of second electrodes of transistors of the two adjacent pixel driving circuits in the (2m-1)-th row and in the (4k-1)-th column and the (4k)-th column, respectively, are parts of a second unitary structure; and active layers, at least portions of first electrodes, and at least portion of second electrodes of transistors of the two adjacent pixel driving circuits in the (2m)-th row and in the (4k-2)-th column and the (4k-1)-th column, respectively, are parts of a third unitary structure.

Optionally, corresponding components of first reset transistors in two adjacent pixel driving circuits in a same row and in the (4k-3)-th column and the (4k-2)-th column have a substantially mirror symmetry; corresponding components of first reset transistors in two adjacent pixel driving circuits in the same row and in the (4k-2)-th column and the (4k-1)-th column have a substantially mirror symmetry; corresponding components of first reset transistors in two adjacent pixel driving circuits in the same row and in the (4k-1)-th column and the (4k)-th column have a substantially mirror symmetry; and corresponding components of second reset transistors in two adjacent pixel driving circuits in a same row and in the (4k-2)-th column and the (4k-1)-th column have a substantially mirror symmetry.

Optionally, corresponding components of sixth transistors in two adjacent pixel driving circuits in the same row and in the (4k-3)-th column and the (4k-2)-th column lack a mirror symmetry; and corresponding components of sixth transistors in two adjacent pixel driving circuits in the same row and in the (4k-1)-th column and the (4k)-th column lack a mirror symmetry.

Optionally, the array substrate further comprises a first reset signal network and a second reset signal network; wherein the first reset signal network comprises a plurality of first reset signal lines and a plurality of third reset signal lines interconnected to each other; the second reset signal network comprises a plurality of second reset signal lines and a plurality of fourth reset signal lines interconnected to each other; a respective first reset signal line of the plurality of first reset signal lines is connected to one or more third reset signal lines of the plurality of third reset signal lines; a respective third reset signal line of the plurality of third reset signal lines is connected to one or more first reset signal lines of the plurality of first reset signal lines; a respective second reset signal line of the plurality of second reset signal lines is connected to one or more fourth reset signal lines of the plurality of fourth reset signal lines; and a respective fourth reset signal line of the plurality of fourth reset signal lines is connected to one or more second reset signal lines of the plurality of second reset signal lines.

Optionally, the array substrate further comprises pixel driving circuits arranged in K number of columns and M number of rows, K and M being positive integers; the K number of columns comprise a (4k-3)-th column of the K columns, a (4k-2)-th column of the K columns, a (4k-1)-th column of the K columns, and a 4k-th column of the K columns, k being a positive integer, $1 \leq k \leq (K/4)$; the M number of rows comprise a (2m-1)-th row of the M rows, and a 2m-th row of the M rows, m being a positive integer, $1 \leq m \leq (M/2)$; the plurality of third reset signal lines are absent in the (4k-2)-th column and in the (4k)-th column; the plurality of fourth reset signal lines are absent in the (4k-3)-th column and in the (4k-1)-th column; the plurality of first reset signal lines are absent in the (2m)-th row; and the plurality of second reset signal lines are absent in the (2m-1)-th row.

Optionally, a respective first reset signal line of the plurality of first reset signal lines in the (2m-1)-th row is connected to one or more third reset signal lines of the plurality of third reset signal lines in the (4k-3)-th column or in the (4k-1)-th column; a respective third reset signal line of the plurality of third reset signal lines in the (4k-3)-th column or in the (4k-1)-th column is connected to one or more first reset signal lines of the plurality of first reset signal lines in the (2m-1)-th row; a respective second reset signal line of the plurality of second reset signal lines in the (2m)-th row is connected to one or more fourth reset signal lines of the plurality of fourth reset signal lines in the (4k-2)-th column or in the (4k)-th column; and a respective fourth reset signal line of the plurality of fourth reset signal lines in the (4k-2)-th column or in the (4k)-th column is connected to one or more second reset signal lines of the plurality of second reset signal lines in the (2m)-th row.

In another aspect, the present disclosure provides a display apparatus, comprising the array substrate described herein, and one or more integrated circuits connected to the array substrate.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an array substrate and a display apparatus that substantially obviate one or more of the problems due to limitations and disadvantages of the related art. In one aspect, the present disclosure provides an array substrate. In some embodiments, the array substrate includes a plurality of data lines. Optionally, the plurality of data lines comprise a first respective data line configured to provide data signals to first electrodes of data write transistors in a same column of pixel driving circuits and in a first row of two adjacent rows of pixel driving circuits; and a second respective data line configured to provide data signals to first electrodes of data write transistors in the same column of pixel driving circuits and in a second row of the two adjacent rows of pixel driving circuits. Optionally, the first respective data line and the second respective data line at least partially extend in the same column. Optionally, the first respective data line is electrically isolated from the first electrodes of the data write transistors in the same column of pixel driving circuits and in the second row of the two adjacent rows of pixel driving circuits. Optionally, the second respective data line is electrically isolated from the first electrodes of the data write transistors in the same column of pixel driving circuits and in the first row of the two adjacent rows of pixel driving circuits.

Various appropriate pixel driving circuits may be used in the present array substrate. Examples of appropriate driving circuits include 3T1C, 2T1C, 4T1C, 4T2C, 5T2C, 6T1C, 7T1C, 7T2C, 5T1C, and 8T2C. In some embodiments, the respective one of the plurality of pixel driving circuits is a 7T1C driving circuit. Various appropriate light emitting elements may be used in the present array substrate. Examples of appropriate light emitting elements include organic light emitting diodes, quantum dots light emitting diodes, and micro light emitting diodes. Optionally, the light emitting element is micro light emitting diode. Optionally, the light emitting element is an organic light emitting diode including an organic light emitting layer.

Figure 1:
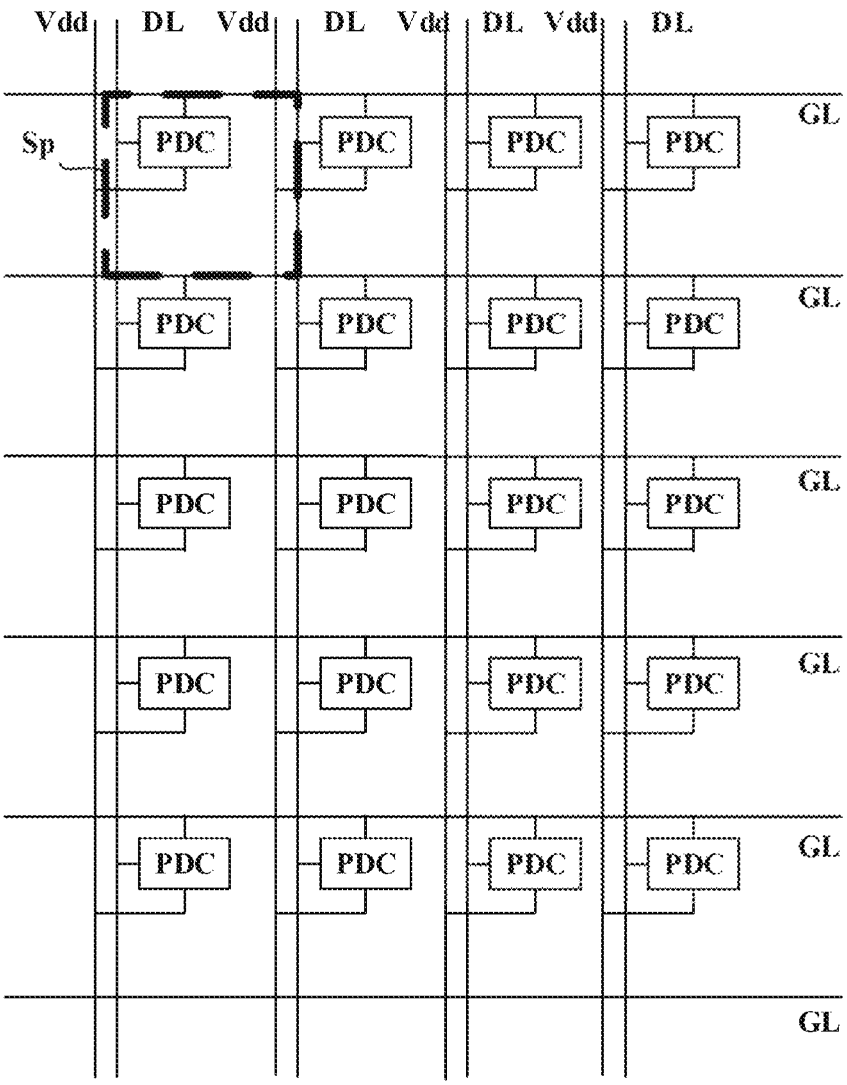
FIG. 1 is a plan view of an array substrate in some embodiments according to the present disclosure.

FIG. 1 is a plan view of an array substrate in some embodiments according to the present disclosure. Referring to FIG. 1, the array substrate includes an array of subpixels Sp. Each subpixel includes an electronic component, e.g., a light emitting element. In one example, the light emitting element is driven by a respective pixel driving circuit PDC. The array substrate includes a plurality of gate lines GL, a plurality of data lines DL, a plurality of second voltage supply line Vdd (e.g., a plurality of first voltage supply line and/or a plurality of second voltage supply line. Light emission in a respective subpixel Sp is driven by a respective pixel driving circuit PDC. In one example, a high voltage signal (e.g., a VDD signal) is input, through a respective voltage supply line of the plurality of voltage supply line Vdd, to the respective pixel driving circuit PDC connected to an anode of the light emitting element; a low voltage signal (e.g., a VSS signal) is input, through a low voltage supply line, to a cathode of the light emitting element. A voltage difference between the high voltage signal (e.g., the VDD signal) and the low voltage signal (e.g., the VSS signal) is a driving voltage $\Delta V$ that drives light emission in the light emitting element.

Figure 2A:
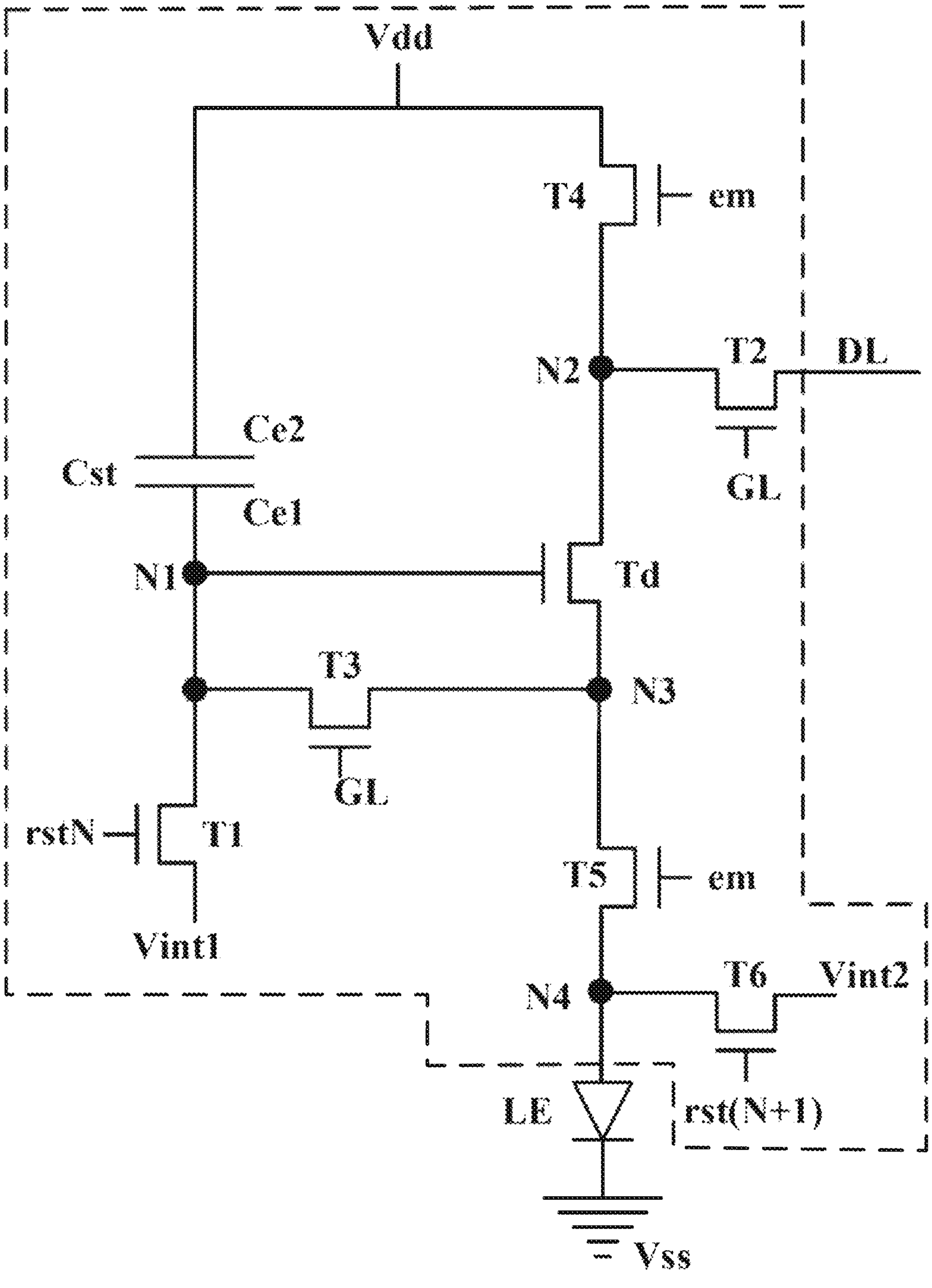
FIG. 2A is a circuit diagram illustrating the structure of a pixel driving circuit in some embodiments according to the present disclosure.

FIG. 2A is a circuit diagram illustrating the structure of a pixel driving circuit in some embodiments according to the present disclosure. Referring to FIG. 2A, in some embodiments, the pixel driving circuit includes a driving transistor Td; a storage capacitor Cst having a first capacitor electrode Ce1 and a second capacitor electrode Ce2; a first transistor T1 having a gate electrode connected to a respective reset control signal line rstN in a present stage, a first electrode connected to a respective first reset signal line of a plurality of first reset signal lines Vint1, and a second electrode connected to a first capacitor electrode Ce1 of the storage capacitor Cst and a gate electrode of the driving transistor Td; a second transistor T2 having a gate electrode connected to a respective gate line of a plurality of gate lines GL, a first electrode connected to a respective data line of a plurality of data lines DL, and a second electrode connected to a first electrode of the driving transistor Td; a third transistor T3 having a gate electrode connected to the respective gate line, a first electrode connected to the first capacitor electrode Ce1 of the storage capacitor Cst and the gate electrode of the driving transistor Td, and a second electrode connected to a second electrode of the driving transistor Td; a fourth transistor T4 having a gate electrode connected to a respective light emitting control signal line of a plurality of light emitting control signal lines em, a first electrode connected to a respective voltage supply line of a plurality of voltage supply lines Vdd, and a second electrode connected to the first electrode of the driving transistor Td and the second electrode of the second transistor T2; a fifth transistor T5 having a gate electrode connected to the respective light emitting control signal line, a first electrode connected to second electrodes of the driving transistor Td and the third transistor T3, and a second electrode connected to an anode of a light emitting element LE; and a sixth transistor T6 having a gate electrode connected to a reset control signal line rst(N+1) in a next stage, a first electrode connected to a second reset signal line of a plurality of second reset signal lines Vint2, and a second electrode connected to the second electrode of the fifth transistor and the anode of the light emitting element LE. The second capacitor electrode Ce2 is connected to the respective voltage supply line and the first electrode of the fourth transistor T4.

In some embodiments, the pixel driving circuit includes a driving transistor Td, a data write transistor (e.g., the second transistor T2), a compensating transistor (e.g., the third transistor T3), two light emitting control transistors (e.g., the fourth transistor T4 and the fifth transistor T5), and two reset transistors (e.g., the first transistor T1 and the sixth transistor T6).

Figure 2B:
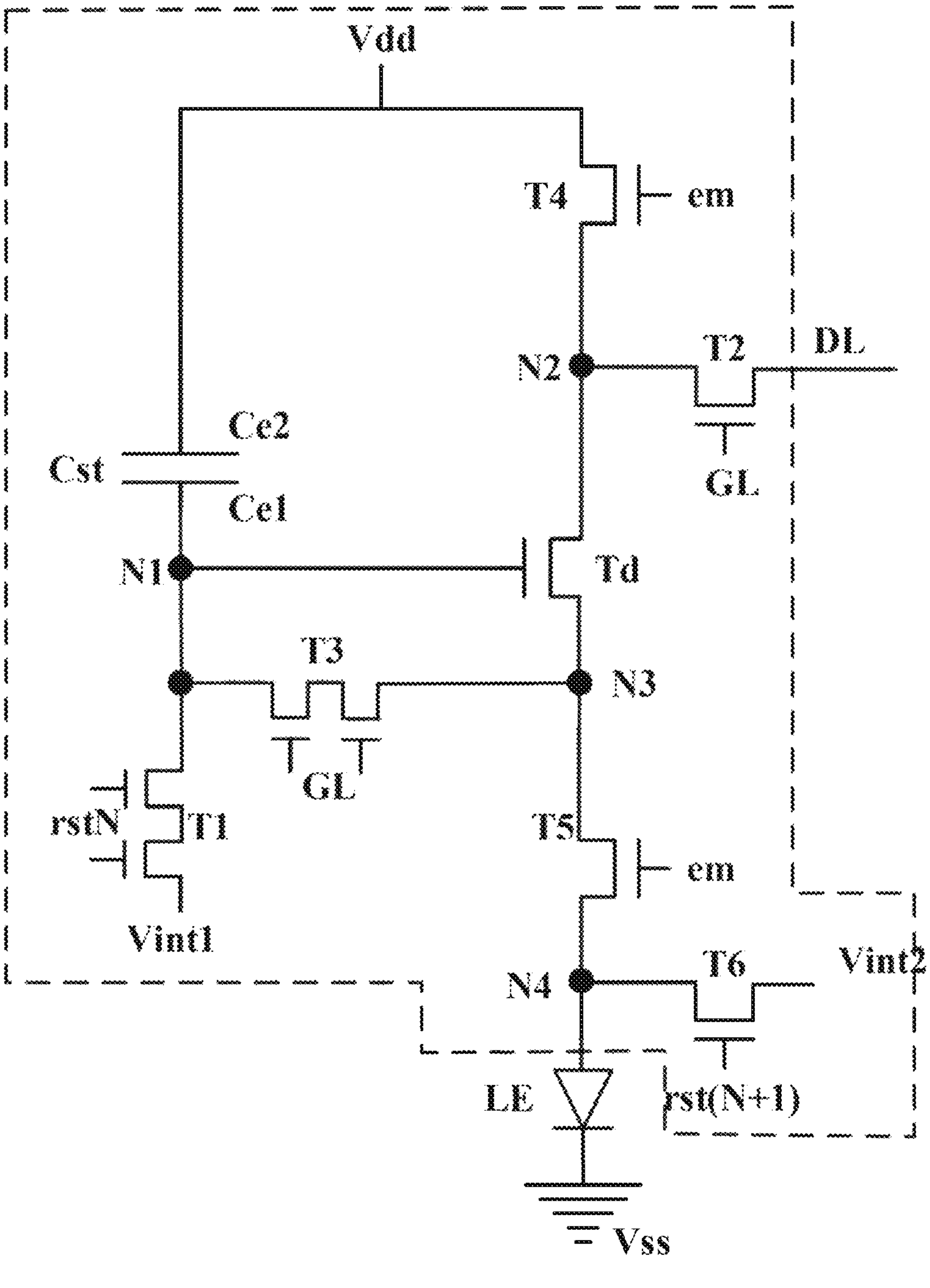
FIG. 2B is a circuit diagram illustrating the structure of a pixel driving circuit in some embodiments according to the present disclosure.

FIG. 2B is a circuit diagram illustrating the structure of a pixel driving circuit in some embodiments according to the present disclosure. Referring to FIG. 2B, in some embodiments, the third transistor T3 is a “double gate” transistor, and the first transistor T1 is a “double gate” transistor. Optionally, in a “double gate” first transistor, the active layer of the first transistor crosses over a respective reset control signal lines twice (alternatively, the respective reset control signal line crosses over the active layer of the first transistor T1 twice). Similarly, in a “double gate” third transistor, the active layer of the third transistor T3 crosses over a respective first gate line of the plurality of first gate lines GL1 twice (alternatively, the respective gate line crosses over the active layer of the third transistor T3 twice). The gate electrode of the first transistor T1 is denoted as “G1” in FIG. 3D, in which the first transistor T1 is a “double gate” transistor. The gate electrode of the third transistor T3 is denoted as “G3” in FIG. 3D, in which the third transistor T3 is a “double gate” transistor.

The pixel driving circuit further include a first node N1, a second node N2, a third node N3, and a fourth node N4. The first node N1 is connected to the gate electrode of the driving transistor Td, the first capacitor electrode Ce1, and the first electrode of the third transistor T3. The second node N2 is connected to the second electrode of the fourth transistor T4, the second electrode of the second transistor T2, and the first electrode of the driving transistor Td. The third node N3 is connected to the second electrode of the driving transistor Td, the second electrode of the third transistor T3, and the first electrode of the fifth transistor T5. The fourth node N4 is connected to the second electrode of the fifth transistor T5, the second electrode of the sixth transistor T6, and the anode of the light emitting element LE.

As used herein, a first electrode or a second electrode refers to one of a first terminal and a second terminal of a transistor, the first terminal and the second terminal being connected to an active layer of the transistor. A direction of a current flowing through the transistor may be configured to be from a first electrode to a second electrode, or from a second electrode to a first electrode. Accordingly, depending on the direction of the current flowing through the transistor, in one example, the first electrode is configured to receive an input signal and the second electrode is configured to output an output signal; in another example, the second electrode is configured to receive an input signal and the first electrode is configured to output an output signal.

Figure 2C:
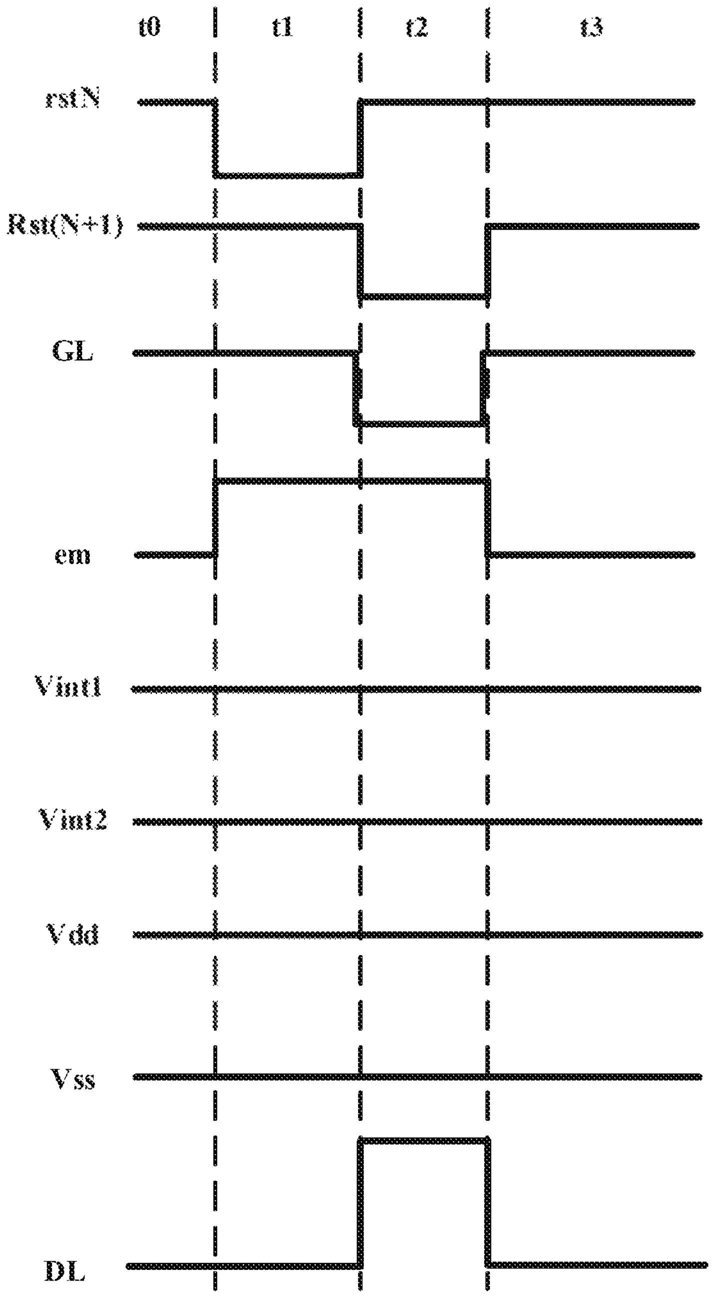
FIG. 2C is a timing diagram illustrating the operation of a pixel driving circuit in some embodiments according to the present disclosure.

FIG. 2C is a timing diagram illustrating the operation of a pixel driving circuit in some embodiments according to the present disclosure. Referring to FIG. 2A to FIG. 2C, during one frame of image, the operation of the pixel driving circuit includes a reset sub-phase t1, a data write sub-phase t2, and a light emitting sub-phase t3. In the initial sub-phase t0, a turning-off reset control signal is provided through the respective reset control signal line of the plurality of reset control signal lines rst to the gate electrode of the first transistor T1 to turn off the first transistor T1. In the initial sub-phase t0, the respective gate line of the plurality of gate lines GL is provided with a turning-off signal, thus the second transistor T2 and the third transistor T3 are turned off.

In the reset sub-phase t1, a turning-on reset control signal is provided through the respective reset control signal line of the plurality of reset control signal lines rst to the gate electrode of the first transistor T1 to turn on the first transistor T1; allowing an initialization voltage signal from the respective first reset signal line of the plurality of first reset signal lines Vint1 to pass from a first electrode of the first transistor T1 to a second electrode of the first transistor T1, and in turn to the first capacitor electrode Ce1 and the gate electrode of the driving transistor Td. The gate electrode of the driving transistor Td is initialized. The second capacitor electrode Ce2 receives a high voltage signal from the respective second voltage supply line of the plurality of second voltage supply lines Vdd2. The first capacitor electrode Ce1 is charged in the reset sub-phase t1 due to an increasing voltage difference between the first capacitor electrode Ce1 and the second capacitor electrode Ce2. In the reset sub-phase t1, the respective gate line of the plurality of gate lines G1, is provided with a turning-off signal, thus the second transistor T2 and the third transistor T3 are turned off. The respective light emitting control signal line of the plurality of light emitting control signal lines em is provided with a high voltage signal to turn off the fourth transistor T4 and the fifth transistor T5.

In the data write sub-phase t2, the turning-off reset control signal is again provided through the respective reset control signal line of the plurality of reset control signal lines rst to the gate electrode of the first transistor T1 to turn off the first transistor T1. The respective gate line of the plurality of gate lines GL is provided with a turning on signal, thus the second transistor T2 and the third transistor T3 are turned on. A second electrode of the driving transistor Td is connected with the second electrode of the third transistor T3. A gate electrode of the driving transistor Td is electrically connected with the first electrode of the third transistor T3. Because the third transistor T3 is turned on in the data write sub-phase t2, the gate electrode and the second electrode of the driving transistor Td are connected and short circuited, and only the PN junction between the gate electrode and a first electrode of the driving transistor Td is effective, thus rendering the driving transistor Td in a diode connecting mode. The second transistor T2 is turned on in the data write sub-phase t2. The data voltage signal transmitted through the respective data line of a plurality of data lines DL is received by a first electrode of the second transistor T2, and in turn transmitted to the first electrode of the driving transistor Td, which is connected to the second electrode of the second transistor T2. A node N2 connecting to the first electrode of the driving transistor Td has a voltage level of the data voltage signal. Because only the PN junction between the gate electrode and a first electrode of the driving transistor Td is effective, the voltage level at the node N1 in the data write sub-phase t2 increase gradually to (Vdata+Vth), wherein the Vdata is the voltage level of the data voltage signal, and the Vth is the voltage level of the threshold voltage Th of the PN junction. The storage capacitor Cst is discharged because the voltage difference between the first capacitor electrode Ce1 and the second capacitor electrode Ce2 is reduced to a relatively small value. The respective light emitting control signal line of the plurality of light emitting control signal lines em is provided with a high voltage signal to turn off the fourth transistor T4 and the fifth transistor T5.

In the data write sub-phase t2, a turning-on reset control signal is provided through the respective reset control signal line of the plurality of reset control signal line rst in a next adjacent stage to the gate electrode of the sixth transistor T6 to turn on the sixth transistor T6; allowing an initialization voltage signal from the respective second reset signal line of the plurality of second reset signal lines Vint2 to pass from a first electrode of the sixth transistor T6 to a second electrode of the sixth transistor T6; and in turn to the node N4. The anode of the light emitting element LE is initialized.

In the light emitting sub-phase t3, the turning-off reset control signal is again provided through the respective reset control signal line of the plurality of reset control signal lines rst to the gate electrode of the first transistor T1 to turn off the first transistor T1. The respective gate line of the plurality of gate lines GL is provided with a turning-off signal, the second transistor T2 and the third transistor T3 are turned off. The respective light emitting control signal line of the plurality of light emitting control signal lines em is provided with a low voltage signal to turn on the fourth transistor T4 and the fifth transistor T5. The voltage level at the node N1 in the light emitting sub-phase t3 is maintained at (Vdata+Vth), the driving transistor Td is turned on by the voltage level, and working in the saturation area. A path is formed through the fourth transistor T4, the driving transistor Td, the fifth transistor T5, to the light emitting element LE, The driving transistor Td generates a driving current for driving the light emitting element LE to emit light. A voltage level at a node N3 connected to the second electrode of the driving transistor Td equals to a light emitting voltage of the light emitting element LE.

The array substrate in some embodiments includes a plurality of subpixels. In some embodiments, the plurality of subpixels includes a respective first subpixel, a respective second subpixel, and a respective third subpixel. Optionally, a respective pixel of the array substrate includes the respective first subpixel, the respective second subpixel, and the respective third subpixel. The plurality of subpixels in the array substrate are arranged in an array. In one example, the array of the plurality of subpixels includes a S1-S2-S3 format repeating array, in which S1 stands for the respective first subpixel, S2 stands for the respective second subpixel, and S3 stands for the respective third subpixel. In another example, the S1-S2-S3 format is a C1-C2-C3 format, in which C1 stands for the respective first subpixel of a first color, C2 stands for the respective second subpixel of a second color, and C3 stands for the respective third subpixel of a third color. In another example, the C1-C2-C3 format is an R-G-B format, in which the respective first subpixel is a red subpixel, the respective second subpixel is a green subpixel, and the respective third subpixel is a blue subpixel.

In another example, the array of the plurality of subpixels includes a S1-S2-S3-S4 format repeating array, in which S1 stands for the respective first subpixel, S2 stands for the respective second subpixel, S3 stands for the respective third subpixel, and S4 stands for the respective fourth subpixel. In another example, the S1-S2-S3-S4 format is a C1-C2-C3-C4 format, in which C1 stands for the respective first subpixel of a first color, C2 stands for the respective second subpixel of a second color, C3 stands for the respective third subpixel of a third color, and C4 stands for the respective fourth subpixel of a fourth color. In another example, the S1-S2-S3-S4 format is a C1-C2-C3-C2' format, in which C1 stands for the respective first subpixel of a first color, C2 stands for the respective second subpixel of a second color, C3 stands for the respective third subpixel of a third color, and C2' stands for the respective fourth subpixel of the second color. In another example, the C1-C2-C3-C2' format is a R-G-B-G format, in which the respective first subpixel is a red subpixel, the respective second subpixel is a green subpixel, the respective third subpixel is a blue subpixel, and the respective fourth subpixel is a green subpixel.

In some embodiments, a minimum repeating unit of the plurality of subpixels of the array substrate includes a respective first subpixel, a respective second subpixel, and a respective third subpixel. Optionally, each of the respective first subpixel, the respective second subpixel, and the respective third subpixel, includes the first transistor T1, the second transistor T2, the third transistor T3, the fourth transistor T4, the fifth transistor T5, the sixth transistor T6, the driving transistor Td, and the storage capacitor Cst.

In alternative embodiments, a minimum repeating unit of the plurality of subpixels of the array substrate includes a respective first subpixel, a respective second subpixel, a respective third subpixel, and a respective fourth subpixel. Optionally, each of the respective first subpixel, the respective second subpixel, the respective third subpixel, and the respective fourth subpixel, includes the first transistor T1, the second transistor T2, the third transistor T3, the fourth transistor T4, the fifth transistor T5, the sixth transistor T6, the driving transistor Td, and the storage capacitor Cst.

Figure 3A:
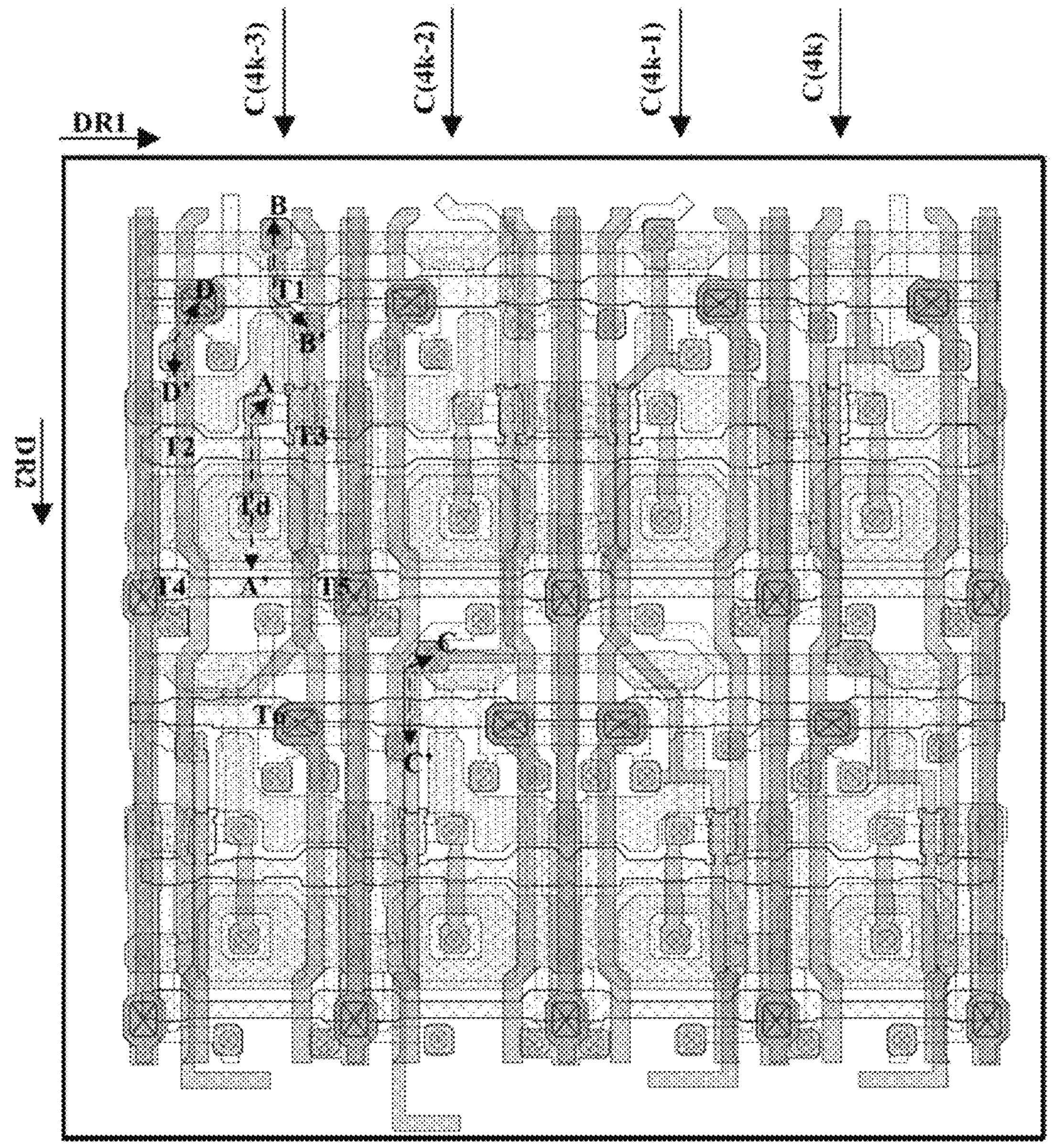
FIG. 3A is a diagram illustrating the structure of a portion of an array substrate in some embodiments according to the present disclosure.
Figure 3B:
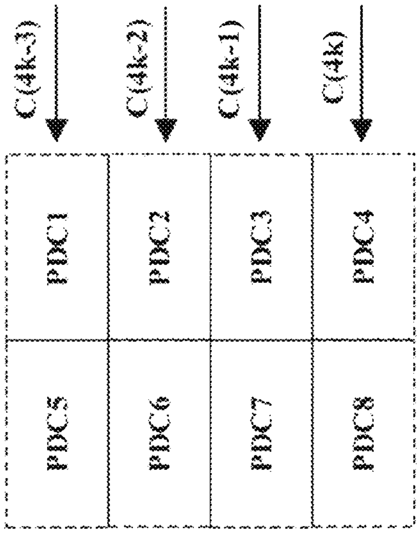
FIG. 3B is a schematic diagram illustrating an arrangement of a plurality of pixel driving circuits in a portion of an array substrate depicted in FIG. 3A.

FIG. 3A is a diagram illustrating the structure of an array substrate in some embodiments according to the present disclosure. FIG. 3B is a schematic diagram illustrating an arrangement of a plurality of pixel driving circuits in an array substrate depicted in FIG. 3A. FIG. 3A and FIG. 3B depicts a portion of the array substrate having eight pixel driving circuits, including PDC1, PDC2, PDC3 PDC4, PDC5, PDC6, PDC7, and PDC8.

Figure 3C:
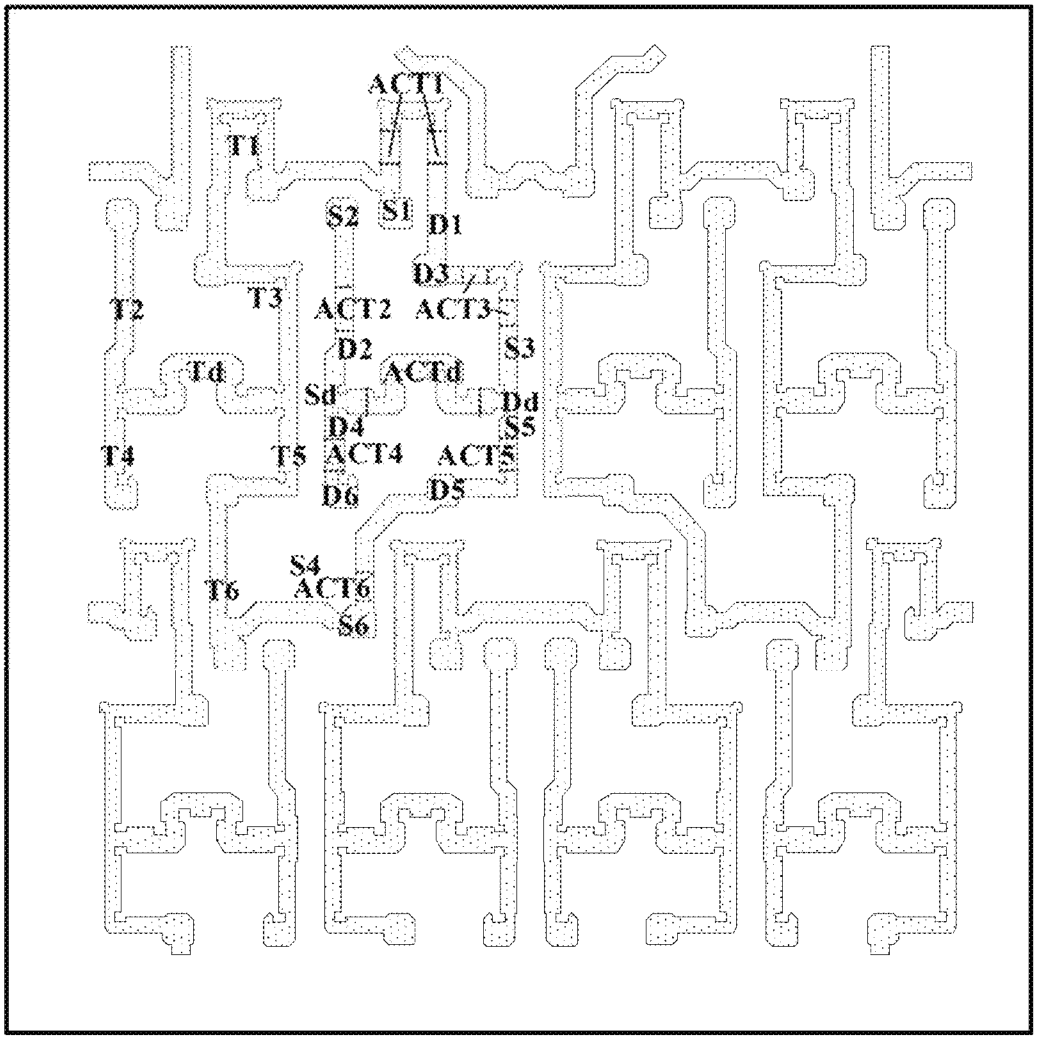
FIG. 3C is a diagram illustrating the structure of a semiconductor material layer in the portion of the array substrate depicted in FIG. 3A.
Figure 3D:
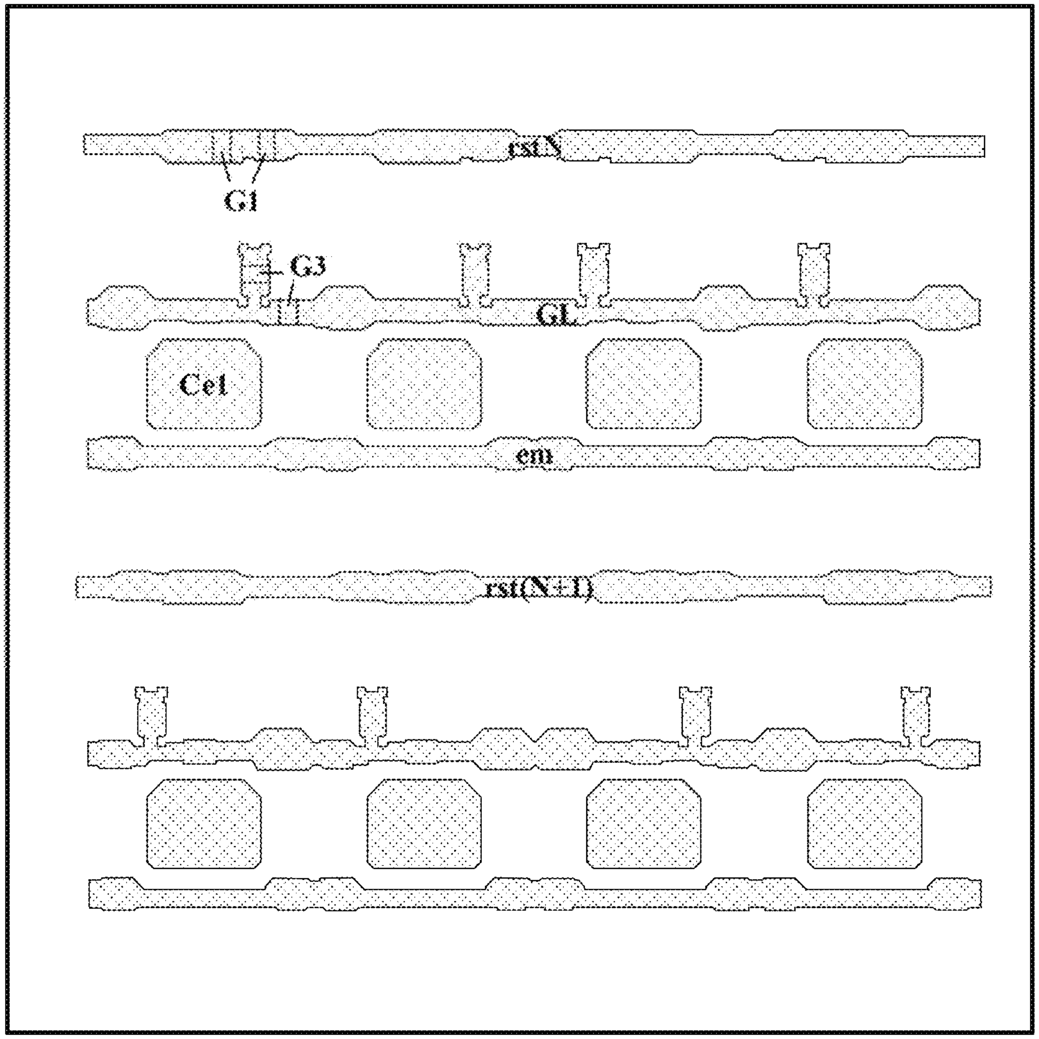
FIG. 3D is a diagram illustrating the structure of a first conductive layer in the portion of the array substrate depicted in FIG. 3A.
Figure 3E:
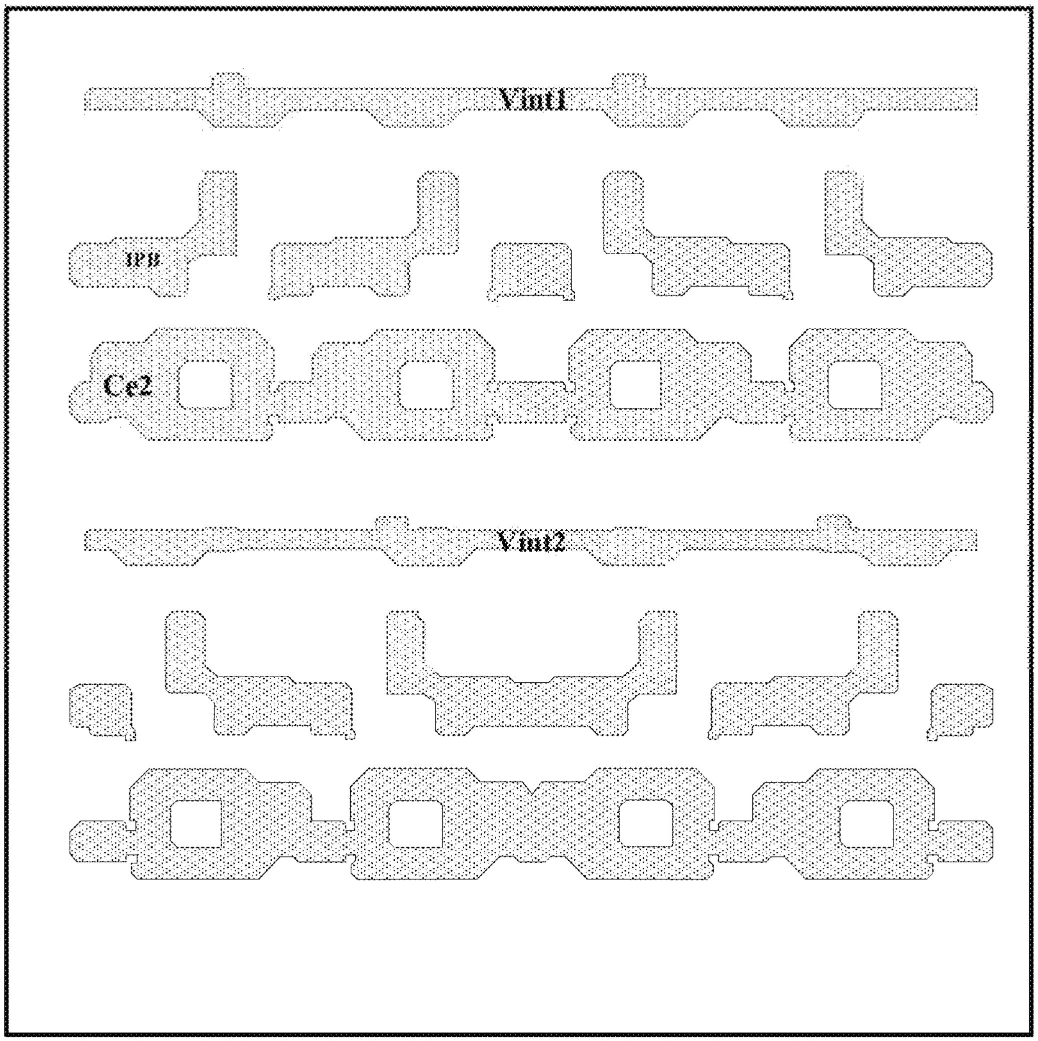
FIG. 3E is a diagram illustrating the structure of a second conductive layer in the portion of the array substrate depicted in FIG. 3A.
Figure 3F:
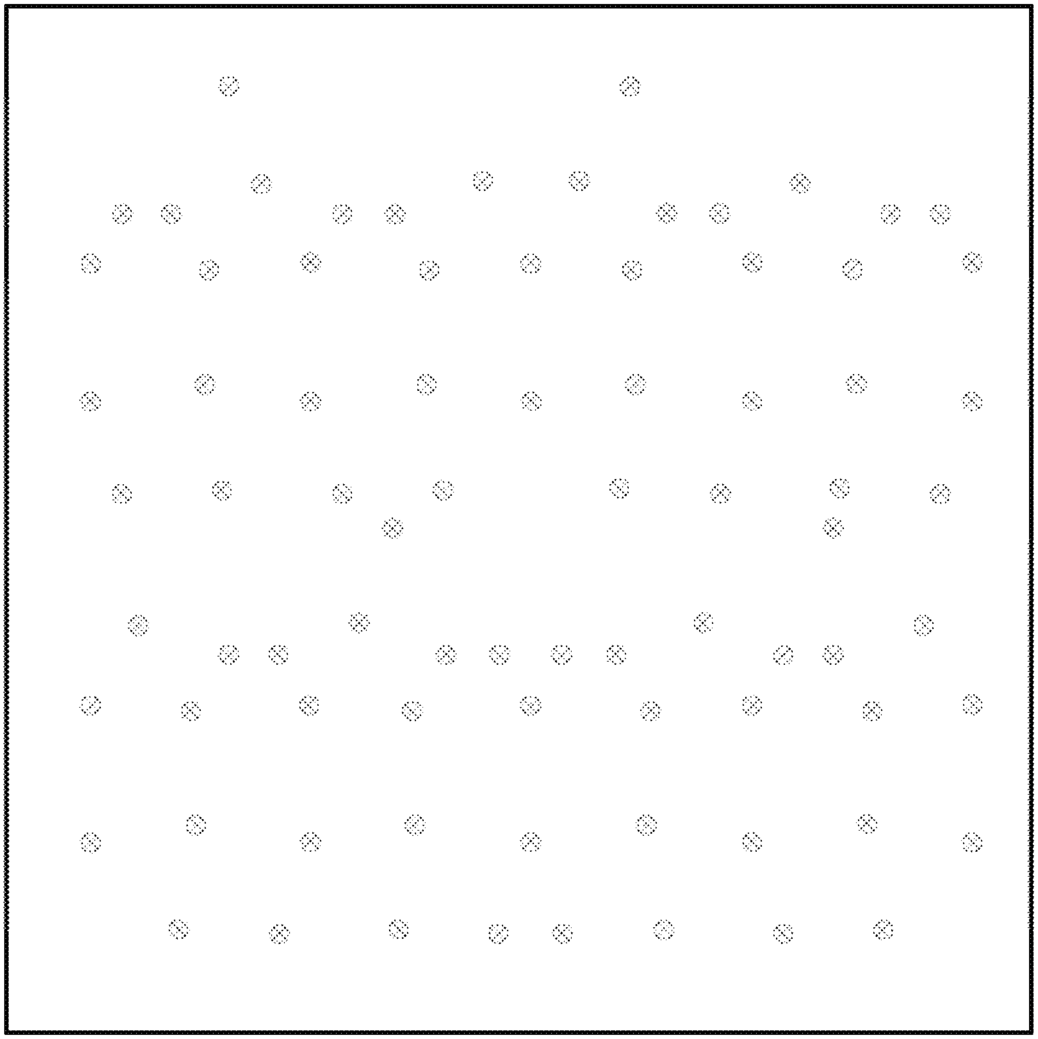
FIG. 3F is a diagram illustrating the structure of an inter-layer dielectric layer in the portion of the array substrate depicted in FIG. 3A.
Figure 3G:
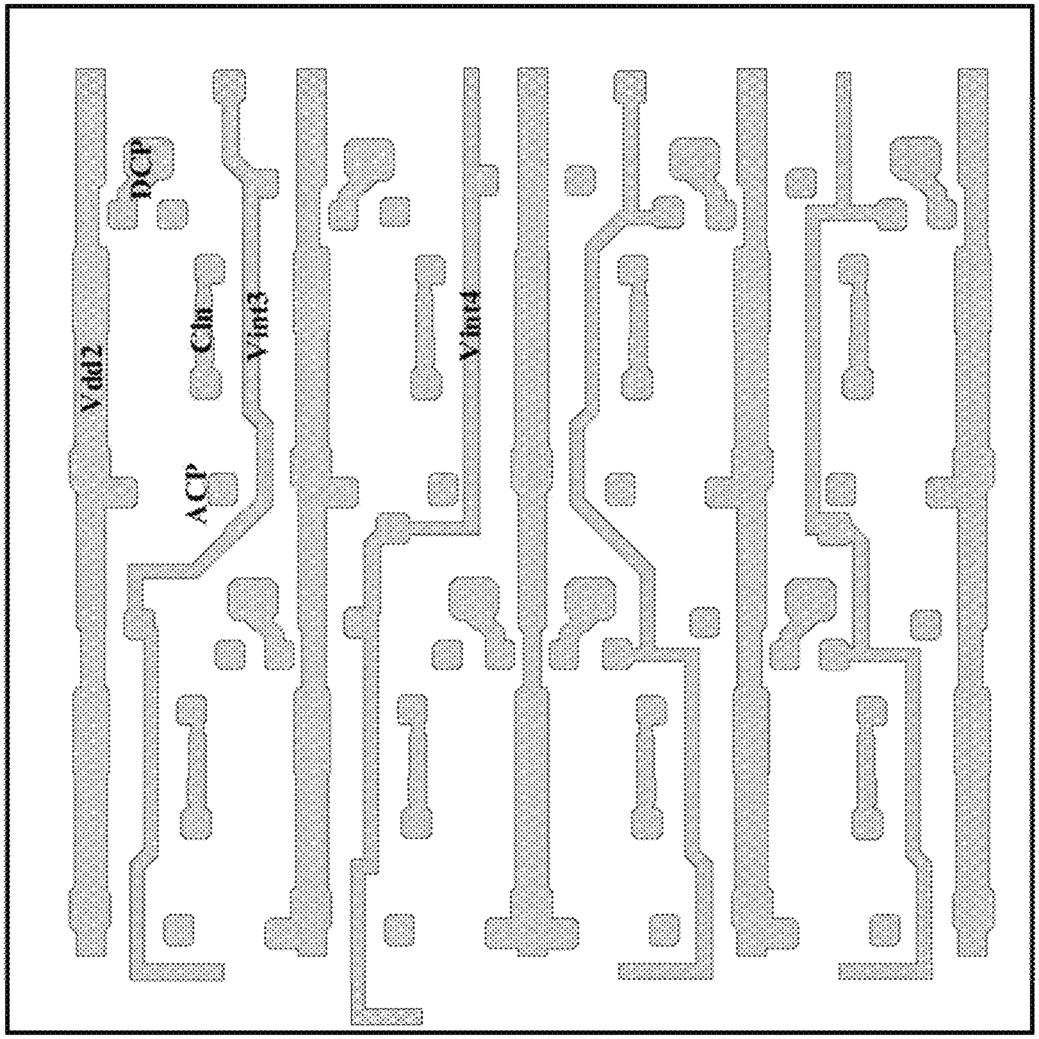
FIG. 3G is a diagram illustrating the structure of a first signal line layer in the portion of the array substrate depicted in FIG. 3A.
Figure 3H:
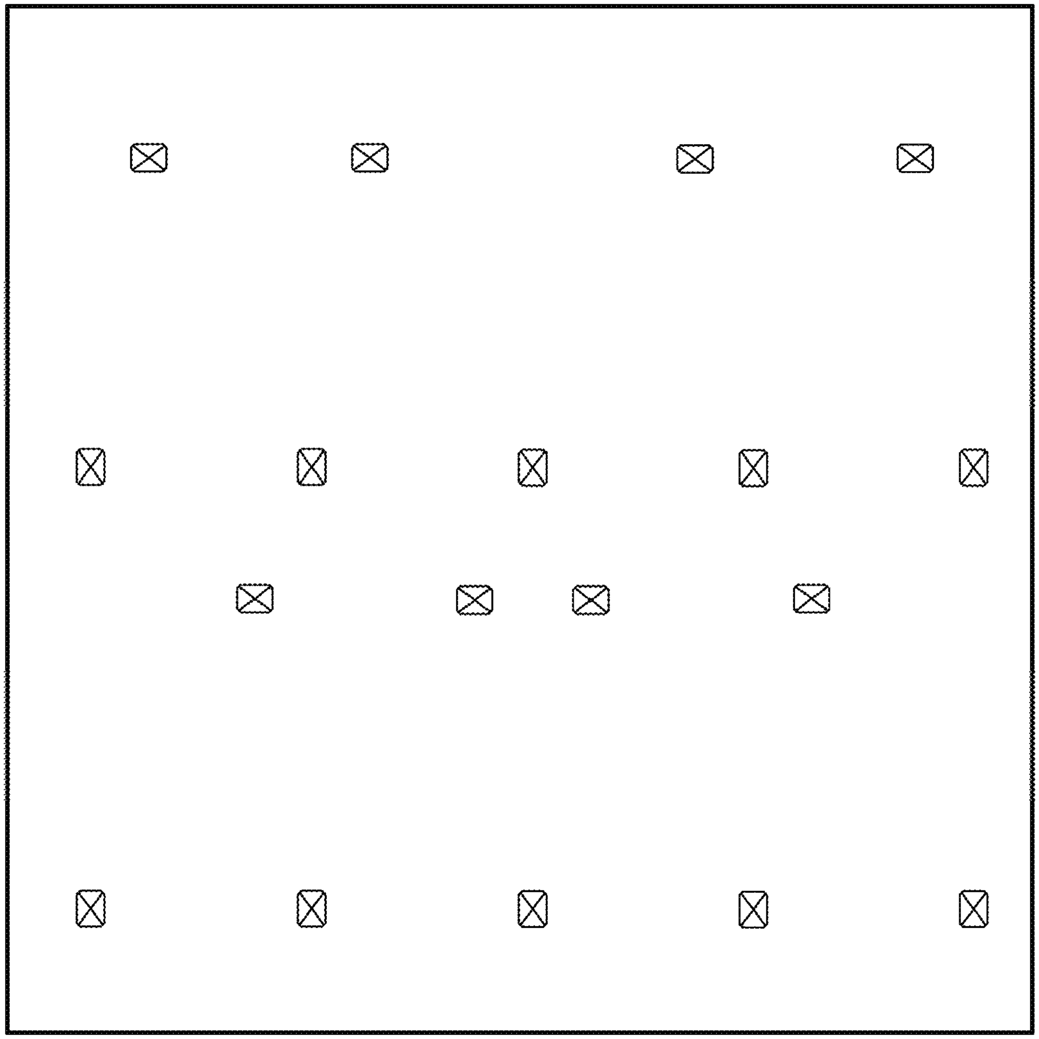
FIG. 3H is a diagram illustrating the structure of a first planarization layer in the portion of the array substrate depicted in FIG. 3A.
Figure 3I:
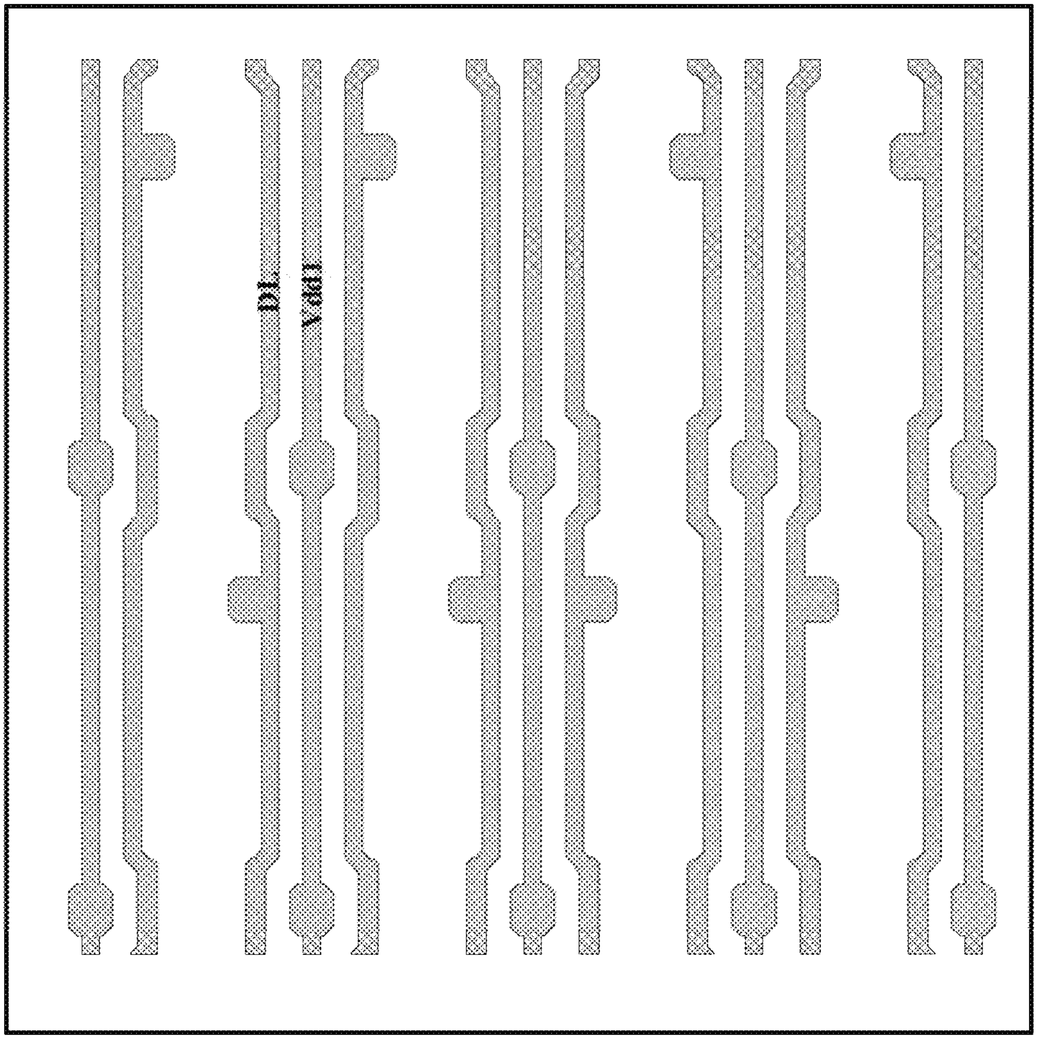
FIG. 3I is a diagram illustrating the structure of a second signal line layer in the portion of the array substrate depicted in FIG. 3A.
Figure 4A:
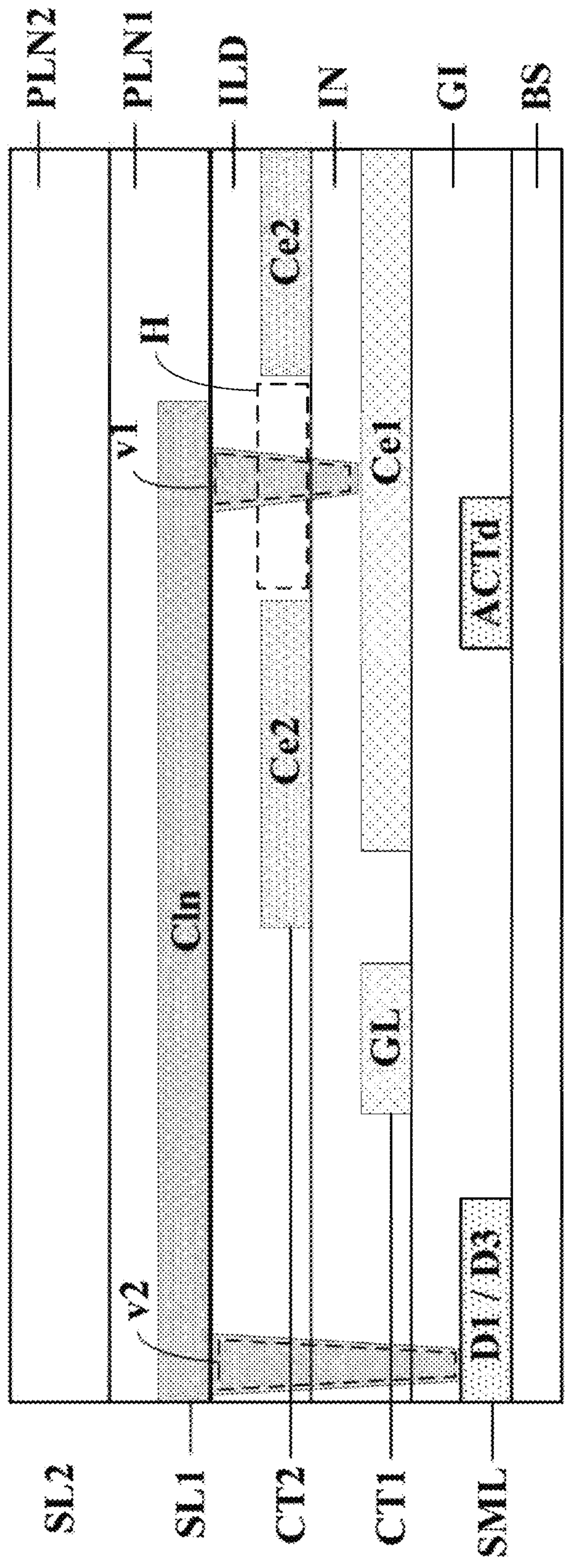
FIG. 4A is a cross-sectional view along an A-A' line in FIG. 3A.
Figure 4B:
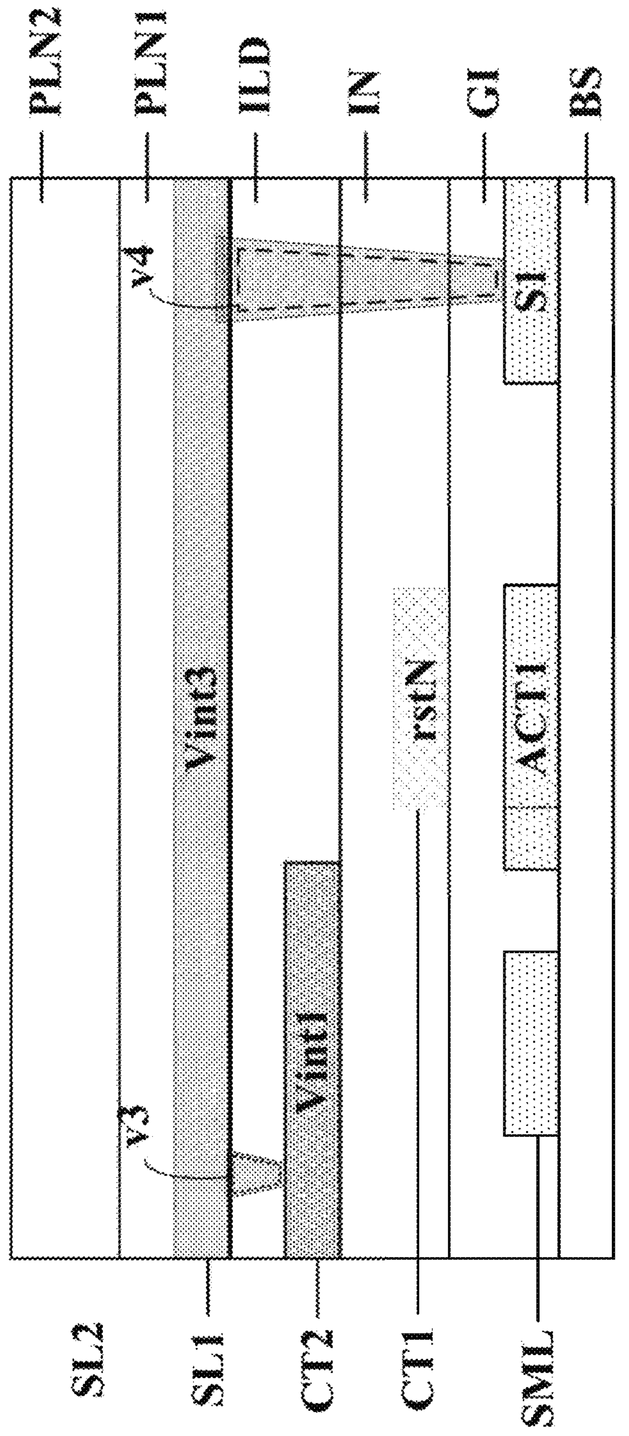
FIG. 4B is a cross-sectional view along a B-B' line in FIG. 3A.
Figure 4C:
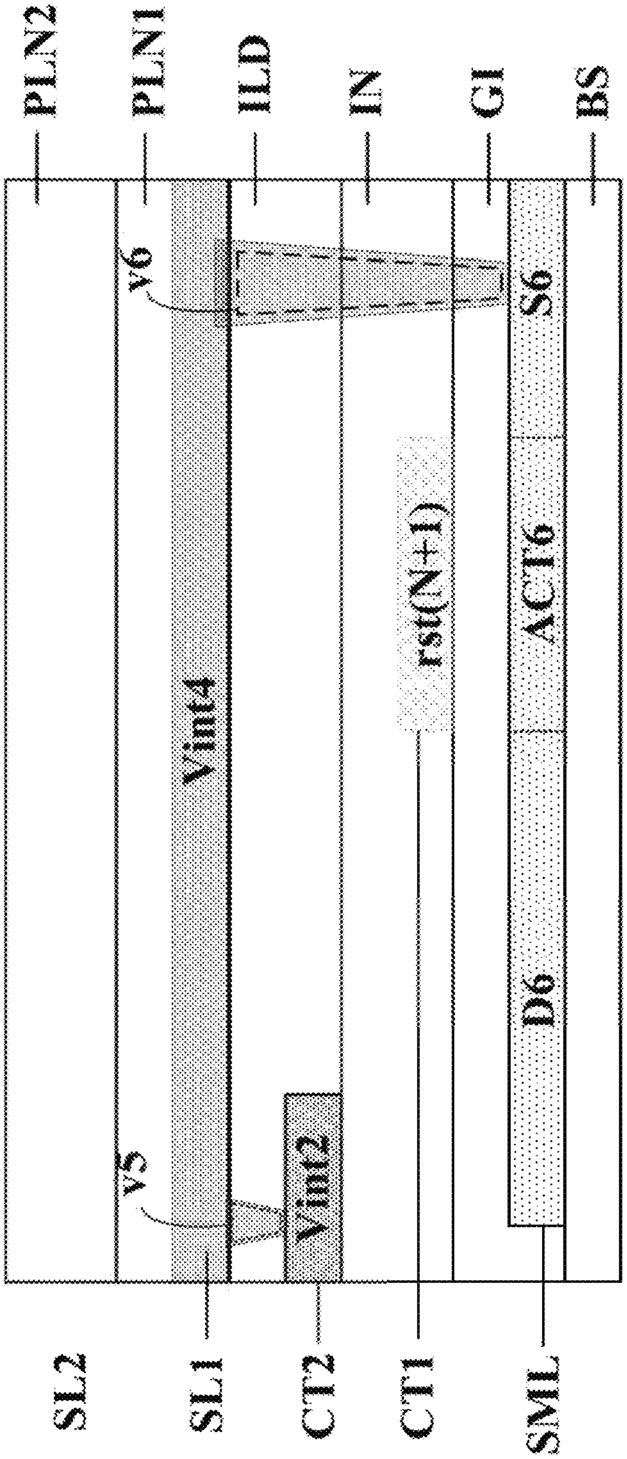
FIG. 4C is a cross-sectional view along a C-C' line in FIG. 3A.
Figure 4D:
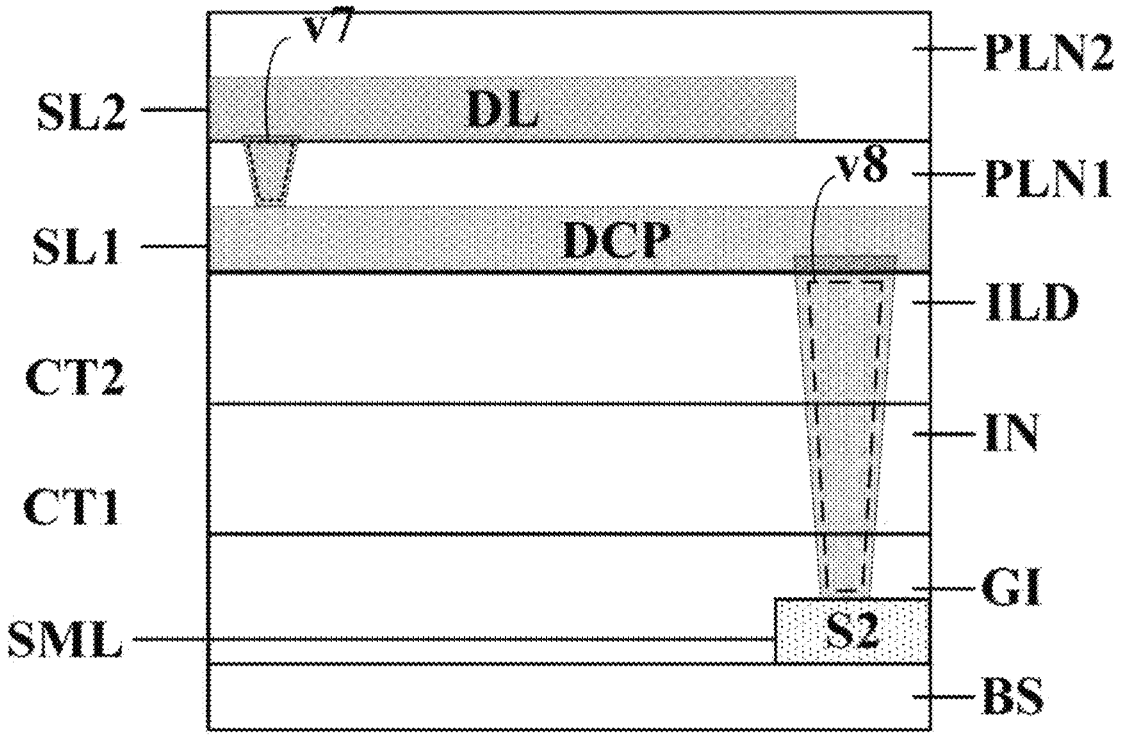
FIG. 4D is a cross-sectional view along a D-D' line in FIG. 3A.

FIG. 3C is a diagram illustrating the structure of a semiconductor material layer in an array substrate depicted in FIG. 3A. FIG. 3D is a diagram illustrating the structure of a first conductive layer in an array substrate depicted in FIG. 3A. FIG. 3E is a diagram illustrating the structure of a second conductive layer in an array substrate depicted in FIG. 3A. FIG. 3F is a diagram illustrating the structure of an inter-layer dielectric layer in an array substrate depicted in FIG. 3A. FIG. 3G is a diagram illustrating the structure of a first signal line layer in an array substrate depicted in FIG. 3A. FIG. 3H is a diagram illustrating the structure of a first planarization layer in an array substrate depicted in FIG. 3A. FIG. 3I is a diagram illustrating the structure of a second signal line layer in an array substrate depicted in FIG. 3A. FIG. 4A is a cross-sectional view along an A-A' line in FIG. 3A. FIG. 4B is a cross-sectional view along a B-B' line in FIG. 3A. FIG. 4C is a cross-sectional view along a C-C' line in FIG. 3A. FIG. 4D is a cross-sectional view along a D-D' line in FIG. 3A.

Referring to FIG. 3A to FIG. 3*i*, and FIG. 4A to FIG. 4*d*, in some embodiments, the display panel includes a base substrate BS, a semiconductor material layer SML on the base substrate BS, a gate insulating layer G1 on a side of the semiconductor material layer SML away from the base substrate BS, a first conductive layer CT1 on a side of the gate insulating layer G1 away from the semiconductor material layer SML, an insulating layer IN on a side of the first conductive layer CT1 away from the gate insulating layer G1, a second conductive layer CT2 on a side of the insulating layer IN away from the first conductive layer CT1, an inter-layer dielectric layer ILD on a side of the second conductive layer CT2 away from the insulating layer IN, a first signal line layer SL1 on a side of the inter-layer dielectric layer ILD away from the second conductive layer CT2, a first planarization layer PLN1 on a side of the first signal line layer SL1 away from the inter-layer dielectric layer ILD, a second signal line layer SL2 on a side of the first planarization layer PLN1 away from the first signal line layer SL1, and a second planarization layer PLN2 on a side of the second signal line layer SL2 away from the first planarization layer PLN1.

Referring to FIG. 2A, FIG. 2B, FIG. 3A, and FIG. 3C, a respective pixel driving circuit is annotated with labels indicating regions corresponding to the plurality of transistors in the respective pixel driving circuit, including the first transistor T1, the second transistor T2, the third transistor T3, the fourth transistor T4, the fifth transistor T5, the sixth transistor T6, and the driving transistor Td. The respective pixel driving circuit is further annotated with labels indicating components of each of the plurality of transistors in the pixel driving circuit. For example, the first transistor T1 includes an active layer ACT1, a first electrode S1, and a second electrode D1. The second transistor T2 includes an active layer ACT2, a first electrode S2, and a second electrode D2. The third transistor T3 includes an active layer ACT3, a first electrode S3, and a second electrode D3. The fourth transistor T4 includes an active layer ACT4, a first electrode S4, and a second electrode D4. The fifth transistor T5 includes an active layer ACT5, a first electrode S5, and a second electrode D5. The sixth transistor T6 includes an active layer ACT6, a first electrode S6, and a second electrode D6. The driving transistor Td includes an active layer ACTd, a first electrode Sd, and a second electrode Dd. In one example, the active layers (ACT1, ACT2, ACT3, ACT4, ACT5, ACT6, and ACTd) of the transistors (T1, T2, T3, T4, T5, T6, and Td) in the respective pixel driving circuit are parts of a unitary structure. In another example, the active layers (ACT1, ACT2, ACT3, ACT4, ACT5, ACT6, and ACTd), the first electrodes (S1, S2, S3, S4, S5, S6, and Sd), and the second electrodes (D1, D2, D3, D4, D5, D6, and Dd) of the transistors (T1, T2, T3, T4, T5, T6, and Td) in the respective pixel driving circuit are parts of a unitary structure. In another example, the active layers (ACT1, ACT2, ACT3, ACT4, ACT5, ACT6, and ACTd) of the transistors (T1, T2, T3, T4, T5, T6, and Td) are in a same layer. In another example, the active layers (ACT1, ACT2, ACT3, ACT4, ACT5, ACT6, and ACTd), the first electrodes (S1, S2, S3, S4, S5, S6, and Sd), and the second electrodes (D1, D2, D3, D4, D5, D6, and Dd) of the transistors (T1, T2, T3, T4, T5, T6, and Td) are in a same layer.

As used herein, the active layer refers to a component of the transistor comprising at least a portion of the semiconductor material layer whose orthographic projection on the base substrate overlaps with an orthographic projection of a gate electrode on the base substrate. A first electrode refers to a component of the transistor connected to one side of the active layer, and a second electrode refers to a component of the transistor connected to another side of the active layer. In the context of a double-gate type transistor (for example, the third transistor T3), the active layer refers to a component of the transistor comprising a first portion of the semiconductor material layer whose orthographic projection on the base substrate overlaps with an orthographic projection of a first gate on the base substrate, a second portion of the semiconductor material layer whose orthographic projection on the base substrate overlaps with an orthographic projection of a second gate on the base substrate, and a third portion between the first portion and the second portion. In the context of a double-gate type transistor, a first electrode refers to a component of the transistor connected to a side of the first portion distal to the third portion, and a second electrode refers to a component of the transistor connected to a side of the second portion distal to the third portion.

Referring to FIG. 2A, FIG. 2B, FIG. 3A, and FIG. 3D, the first conductive layer in some embodiments includes a plurality of first reset control signal lines rst (including a reset control signal line in a present stage rstN and a reset control signal line in a next stage rst(N+1)), a plurality of light emitting control signal lines em, a plurality of gate lines GL, and a first capacitor electrode Ce1 of the storage capacitor Cst. Various appropriate electrode materials and various appropriate fabricating methods may be used to make the first conductive layer. For example, a conductive material may be deposited on the substrate by a plasma-enhanced chemical vapor deposition (PECVD) process and patterned. Examples of appropriate conductive materials for making the first conductive layer include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. Optionally, the plurality of reset control signal lines rst, the plurality of light emitting control signal lines em, the plurality of gate lines GL, and the first capacitor electrode Ce1 of the storage capacitor Cst are in a same layer.

As used herein, the term "same layer" refers to the relationship between the layers simultaneously formed in the same step. In one example, the plurality of gate lines GL and the first capacitor electrode Ce1 are in a same layer when they are formed as a result of one or more steps of a same patterning process performed in a same layer of material. In another example, the plurality of gate lines GL and the first capacitor electrode Ce1 can be formed in a same layer by simultaneously performing the step of forming the plurality of gate lines GL, and the step of forming the first capacitor electrode Ce1. The term "same layer" does not always mean that the thickness of the layer or the height of the layer in a cross-sectional view is the same.

Referring to FIG. 2A, FIG. 2B, FIG. 3A, and FIG. 3E, the second conductive layer in some embodiments includes an interference prevention block IPB, a plurality of first reset signal lines Vint1, a plurality of second reset signal lines Vint2, and a second capacitor electrode Ce2 of the storage capacitor Cst. Various appropriate conductive materials and various appropriate fabricating methods may be used to make the second conductive layer. For example, a conductive material may be deposited on the substrate by a plasma-enhanced chemical vapor deposition (PECVD) process and patterned. Examples of appropriate conductive materials for making the second conductive layer include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. Optionally, the interference prevention block IPB, the plurality of first reset signal lines Vint1, the plurality of second reset signal lines Vint2, and the second capacitor electrode Ce2 of the storage capacitor Cst are in a same layer.

Vias extending through the inter-layer dielectric layer ILD are depicted in FIG. 3F.

Referring to FIG. 2A, FIG. 2B, FIG. 3A, and FIG. 3G, the first signal line layer in some embodiments includes a node connecting line Cln, a plurality of second voltage supply lines Vdd2, an anode connecting pad ACP, and a data signal connecting pad DCP. In some embodiments, the first signal line layer further includes a plurality of third reset signal lines Vint3 and a plurality of fourth reset signal lines Vint4.

The node connecting line Cln connects the first capacitor electrode Ce1 and the second electrode of the third transistor T3 and/or the second electrode of the first transistor T1 in a respective pixel driving circuit together. The data signal connecting pad DCP is configured to connect a respective data line of the plurality of data lines to a first electrode of the second transistor T2. The anode contact pad ACP connects the fourth node N4 and a respective anode in a respective subpixel together. The anode contact pad ACP is connected to second electrodes of the fifth transistor T5 and the sixth transistor T6, and the respective anode in the respective subpixel is connected to the anode contact pad ACP.

The plurality of second voltage supply lines Vdd2 are connected to a plurality of first voltage supply lines in the second signal line layer, and are connected to the second capacitor electrode Ce2 of the storage capacitor in the second conductive layer. Second capacitor electrodes in a same row are interconnected as parts of a unitary structure. The plurality of unitary structures of second capacitor electrodes in a plurality of rows, the plurality of second voltage supply lines Vdd2, and the plurality of first voltage supply lines form an interconnected voltage signal network. A respective second voltage supply line of the plurality of second voltage supply lines Vdd2 is connected to a first electrode of the fourth transistor T4, and connected to the second capacitor electrode Ce2 of the storage capacitor Cst. Optionally, the plurality of second voltage supply lines Vdd2 extend along a direction substantially parallel to a second direction DR2; the plurality of first voltage supply lines extend along a direction substantially parallel to the second direction DR2. Optionally, the unitary structure comprising interconnected second capacitor electrodes in a same row extend along a direction substantially parallel to a first direction DR1. As used herein, the term "substantially parallel" means that an angle is in the range of 0 degree to approximately 45 degrees, e.g., 0 degree to approximately 5 degrees, 0 degree to approximately 10 degrees, 0 degree to approximately 15 degrees, 0 degree to approximately 20 degrees, 0 degree to approximately 25 degrees, 0 degree to approximately 30 degrees.

Various appropriate conductive materials and various appropriate fabricating methods may be used to make the first signal line layer. For example, a conductive material may be deposited on the substrate by a plasma-enhanced chemical vapor deposition (PECVD) process and patterned. Examples of appropriate conductive materials for making the first signal line layer include, but are not limited to, titanium, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. In some embodiments, the first signal line layer includes a plurality of sub-layers stacked together. In one example, the first signal line layer includes a stacked titanium/aluminum/titanium multi-layer structure. In another example, the first signal line layer includes a stacked molybdenum/aluminum/molybdenum multi-layer structure. Optionally, the node connecting line Cln, the plurality of second voltage supply lines Vdd2, the data signal connecting pad DCP, the anode connecting pad ACP, the plurality of third reset signal lines Vint3, and the plurality of fourth reset signal lines Vint4 are in a same layer.

Vias extending through the first planarization layer PLN1 are depicted in FIG. 3H.

Referring to FIG. 2A, FIG. 2B, FIG. 3A, and FIG. 3I, the second signal line layer in some embodiments includes a plurality of first voltage supply lines Vdd1 and a plurality of data line DL. The plurality of first voltage supply lines Vdd1 are connected to a plurality of second voltage supply lines in the first signal line layer, as discussed above. A respective data line of the plurality of data lines is electrically connected to a first electrode of the second transistor T2 through a data signal connecting pad.

Various appropriate conductive materials and various appropriate fabricating methods may be used to make the second signal line layer. For example, a conductive material may be deposited on the substrate by a plasma-enhanced chemical vapor deposition (PECVD) process and patterned. Examples of appropriate conductive materials for making the second signal line layer include, but are not limited to, titanium, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. In some embodiments, the second signal line layer includes a plurality of sub-layers stacked together. In one example, the second signal line layer includes a stacked titanium/aluminum/titanium multi-layer structure. In another example, the second signal line layer includes a stacked molybdenum/aluminum/molybdenum multi-layer structure. Optionally, the plurality of first voltage supply lines Vdd1 and the plurality of data line DL are in a same layer.

Referring to FIG. 3A, FIG. 3B, FIG. 3E, and FIG. 3G, the array substrate includes two adjacent columns of pixel driving circuits, e.g., a first column of pixel driving circuits comprising PDC1, and a second column of pixel driving circuits comprising PDC2. In some embodiments, a third reset signal line of the plurality of third reset signal lines Vint3 is present in a first column of the two adjacent columns of pixel driving circuits, and the plurality of third reset signal lines Vint3 are absent in a second column of the two adjacent columns of pixel driving circuits. In some embodiments, a fourth reset signal line of the plurality of fourth reset signal lines Vint4 is present in a second column of the two adjacent columns of pixel driving circuits, and the plurality of fourth reset signal lines Vint4 are absent in a first column of the two adjacent columns of pixel driving circuits.

In some embodiments, as shown in FIG. 3A to FIG. 3I, a respective third reset signal line of the plurality of third reset signal lines Vint3 is configured to provide reset signals to two adjacent pixel driving circuits in a same row of two adjacent rows of pixel driving circuits, and in the first column and the second column of the two adjacent columns of pixel driving circuits, respectively. In some embodiments, a respective fourth reset signal line of the plurality of fourth reset signal lines Vint4 is configured to provide reset signals to two adjacent pixel driving circuits in the same row of the two adjacent rows of pixel driving circuits, and in the first column and the second column of the two adjacent columns of pixel driving circuits, respectively.

Referring to FIG. 2A, FIG. 2B, FIG. 3A to FIG. 3I, and FIG. 4A, in some embodiments, an orthographic projection of the second capacitor electrode Ce2 on a base substrate BS completely covers, with a margin, an orthographic projection of the first capacitor electrode Ce1 on the base substrate BS except for a hole region H in which a portion of the second capacitor electrode Ce2 is absent. In some embodiments, the first signal line layer includes a node connecting line Cln on a side of the inter-layer dielectric layer ILD away from the second capacitor electrode Ce2. The node connecting line Cln is in a same layer as at least one of the plurality of second voltage supply lines Vdd2, the anode connecting pad ACP, the data signal connecting pad DCP, the plurality of third reset signal lines Vint3, or the plurality of fourth reset signal lines Vint4.

In some embodiments, the first capacitor electrode Ce1 is on a side of the gate insulating layer G1 away from the base substrate BS. Optionally, the array substrate further includes a first via v1 and a second via v2. The first via v1 is in the hole region H and extends through the inter-layer dielectric layer ILD and the insulating layer IN. The second via v2 extends through the inter-layer dielectric layer ILD, the insulating layer IN, and the gate insulating layer G1. Optionally, the node connecting line Cln is connected to the first capacitor electrode Ce1 through the first via v1, and the node connecting line Cln is connected the semiconductor material layer SML through the second via v2. Optionally, the node connecting line Cln is connected to the second electrode D3 of third transistor and/or the second electrode D1 of the first transistor, as depicted in FIG. 4A.

Referring to FIG. 2A, FIG. 2B, FIG. 3A to FIG. 3I, and FIG. 4B, the array substrate in some embodiments further includes a third via v3 and a fourth via v4, The third via v3 extends through the inter-layer dielectric layer ILD. The fourth via v4 extends through the inter-layer dielectric layer ILD, the insulating layer IN, and the gate insulating layer G1. Optionally, a respective third reset signal line of the plurality of third reset signal lines Vint3 is connected to a first reset signal line of the plurality of first reset signal lines Vint1 through the third via v3. Optionally, the respective third reset signal line of the plurality of third reset signal lines Vint3 is connected to a first electrode S1 of the first transistor T1 through the fourth via v4.

Referring to FIG. 2A, FIG. 2B, FIG. 3A to FIG. 3I, and FIG. 4C, the array substrate in some embodiments further includes a fifth via v5 and a sixth via v6. The fifth via v5 extends through the inter-layer dielectric layer ILD. The sixth via v6 extends through the inter-layer dielectric layer ILD, the insulating layer IN, and the gate insulating layer G1. Optionally, a respective fourth reset signal line of the plurality of fourth reset signal lines Vint4 is connected to a second reset signal line of the plurality of second reset signal lines Vint2 through the fifth via v5. Optionally, the respective fourth reset signal line of the plurality of fourth reset signal lines Vint4 is connected to a first electrode S6 of the sixth transistor T6 through the sixth via v6.

Referring to FIG. 2A, FIG. 2B, FIG. 3A to FIG. 3I, and FIG. 4D, the array substrate in some embodiments further includes a seventh via v7 and an eighth via v8. The seventh via v7 extends through the first planarization layer PLN1. The eighth via v8 extends through the inter-layer dielectric layer ILD, the insulating layer IN, and the gate insulating layer G1. Optionally, a data line of the plurality of data lines DL is connected to a data signal connecting pad DCP through the seventh via v7. Optionally, the data line of the plurality of data lines DL is connected to a first electrode S2 of the second transistor T2 through the eighth via v8.

Figure 5:
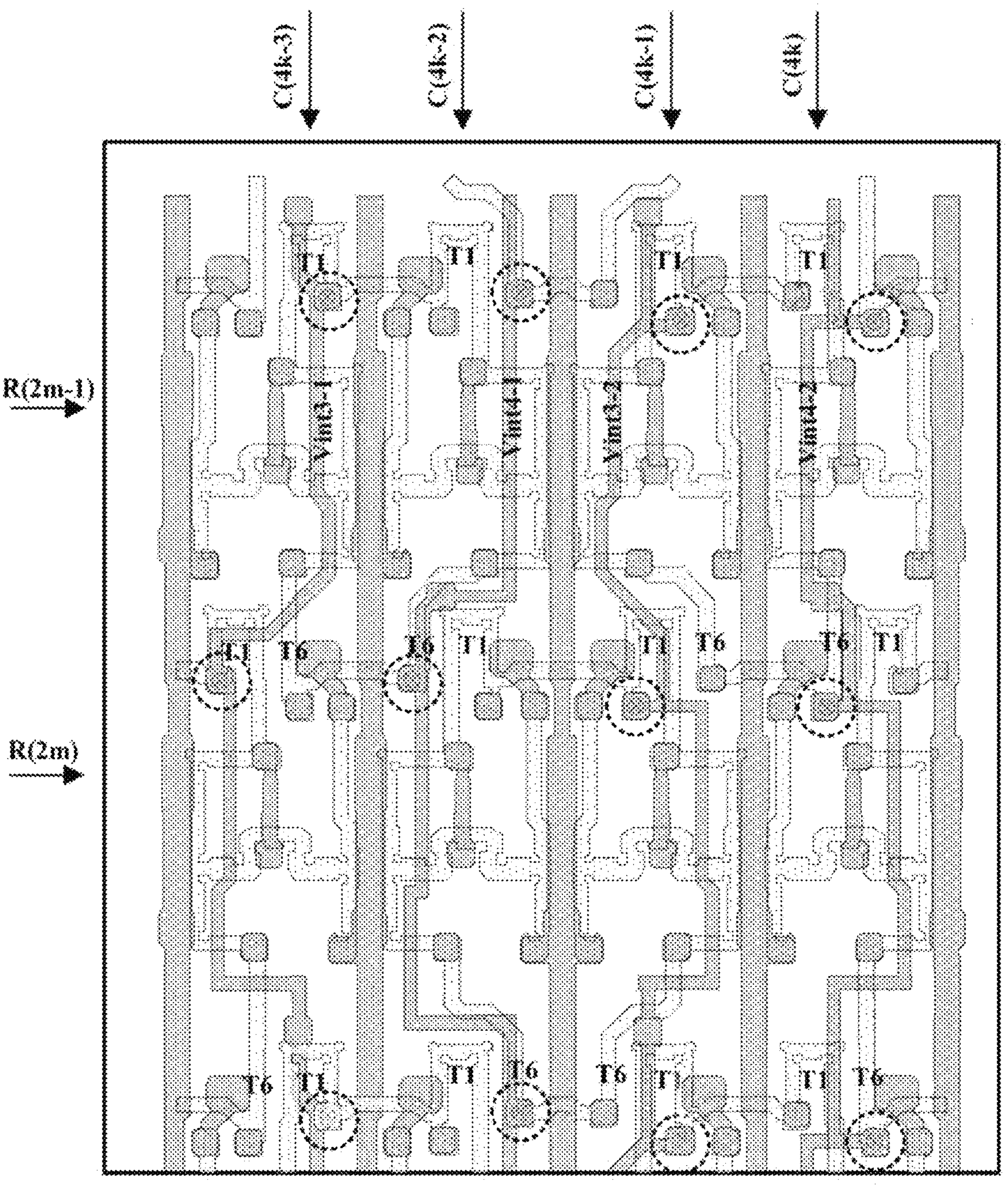
FIG. 5 is a diagram illustrating connection between certain reset signal lines and corresponding transistors in the array substrate depicted in FIG. 3A.

FIG. 5 is a diagram illustrating connection between certain reset signal lines and corresponding transistors in the array substrate depicted in FIG. 3A. Referring to FIG. 3A, FIG. 3C, FIG. 3G, and FIG. 5, the connection points between the reset signal lines and the corresponding transistors are denoted by circles of dotted lines. In some embodiments, a first adjacent third reset signal line Vint3-1 of the plurality of third reset signal lines is configured to provide reset signals to first electrodes of first transistors respectively in two adjacent pixel driving circuits in a first row of two adjacent rows of pixel driving circuits, and in a first column and a second column of two adjacent columns of pixel driving circuits, respectively; a first adjacent fourth reset signal line Vint4-1 of the plurality of fourth reset signal lines is configured to provide reset signals to first electrodes of sixth transistors respectively in the two adjacent pixel driving circuits in the first row of two adjacent rows of pixel driving circuits, and in the first column and the second column of the two adjacent columns of pixel driving circuits, respectively. Optionally, the first adjacent third reset signal line Vint3-1 at least partially extends in (e.g., extends through) the first column of the two adjacent columns of pixel driving circuits; and the first adjacent fourth reset signal line Vint4-1 at least partially extends in (e.g., extends through) the second column of the two adjacent columns of pixel driving circuits.

In some embodiments, a second adjacent third reset signal line Vint3-2 of the plurality of third reset signal lines is configured to provide reset signals to first electrodes of first transistors respectively in two adjacent pixel driving circuits in the first row of the two adjacent rows of pixel driving circuits, and in a third column and a fourth column of two adjacent columns of pixel driving circuits, respectively; a second adjacent fourth reset signal line Vint4-2 of the plurality of fourth reset signal lines is configured to provide reset signals to first electrodes of sixth transistors respectively in the two adjacent pixel driving circuits in the first row of the two adjacent rows of pixel driving circuits, and in the third column and the fourth column of the two adjacent columns of pixel driving circuits, respectively. Optionally, the second adjacent third reset signal line Vint3-2 at least partially extends in (e.g., extends through) the third column of the two adjacent columns of pixel driving circuits; and the second adjacent fourth reset signal line Vint4-2 at least partially extends in (e.g., extends through) the fourth column of the two adjacent columns of pixel driving circuits. Optionally, the first column, the second column, the third column, and the fourth column are sequentially arranged. Optionally, adjacent columns are spaced apart by a first voltage supply line of the plurality of first voltage supply lines Vdd1 or a second voltage supply line of the plurality of second voltage supply lines Vdd2.

In some embodiments, the second adjacent third reset signal line Vint3-2 of the plurality of third reset signal lines is configured to provide reset signals to first electrodes of first transistors respectively in two adjacent pixel driving circuits in a second row of the two adjacent rows of pixel driving circuits, and in the second column and the third column of two adjacent columns of pixel driving circuits, respectively; the first adjacent fourth reset signal line Vint4-1 of the plurality of fourth reset signal lines is configured to provide reset signals to first electrodes of sixth transistors respectively in the two adjacent pixel driving circuits in the second row of two adjacent rows of pixel driving circuits, and in the second column and the third column of the two adjacent columns of pixel driving circuits, respectively. Optionally, the first row and the second row are sequentially arranged.

In some embodiments, the array substrate includes pixel driving circuits arranged in K number of columns and M number of rows, K and M being positive integers. The array substrate includes K number of reset signal lines configured to provide reset signals to reset transistors in of the array substrate. In some embodiments, the K number of columns include a (4k-3)-th column C(4k-3) of the K columns, a (4k-2)-th column C(4k-2) of the K columns, a (4k-1)-th column C(4k-1) of the K columns, and a 4k-th column C(4k) of the K columns, k being a positive integer, $I \leq k \leq (K/4)$. The M number of rows include a (2m-1)-th row R(2m-1) of the M rows, and a 2m-th row R(2) of the M rows, m being a positive integer, $I \leq m \leq (M/2)$. In some embodiments, the K number of reset signal lines include a plurality of third reset signal lines in the (4k-3)-th column C(4k-3) of the K columns, or in the (4k-1)-th column C(4k-1) of the K columns; and a plurality of fourth reset signal lines in the (4k-2)-th column C(4k-2) of the K columns, or in the 4k-th column C(4k) of the K columns. Optionally, adjacent columns are spaced apart by a first voltage supply line of the plurality of first voltage supply lines Vdd1.

In some embodiments, the K number of reset signal lines include a first adjacent third reset signal line Vint3-1 in the (4k-3)-th column C(4k-3) of the K columns, a second adjacent third reset signal line Vint3-2 in the (4k-1)-th column C(4k-1) of the K columns; a first adjacent fourth reset signal line Vint4-1 in the (4k-2)-th column C(4k-2) of the K columns, and a second adjacent fourth reset signal line Vint4-2 in the 4k-th column C(4k) of the K columns. The first adjacent third reset signal line Vint3-1, the first adjacent fourth reset signal line Vint4-1, the second adjacent third reset signal line Vint3-2, and the second adjacent fourth reset signal line Vint4-2 are sequentially arranged.

As used herein, the terms "(4k-3)-th column", "(4k-2)-th column", "(4k-1)-th column", and "(4k)-th column" are used in the context of the K columns. The array substrate may or may not include additional column(s) before the first column of the K columns and/or additional columns after the last column of the K columns. In the context of the array substrate, the term "(4k-3)-th column" or "(4k-1)-th column" does not necessarily denote an odd-numbered column, and the term "(4k-2)-th column" or "(4k)-th column does not necessarily denote an even-numbered column. In one example, the (4k-3)-th column is an odd-numbered column in the context of the K columns, but may be an even-numbered column in the context of the array substrate. In another example, the (4k-3)-th column is an odd-numbered column in the context of the K columns, and also an odd-numbered column in the context of the array substrate. In one example, the (4k-2)-th column is an even-numbered column in the context of the K columns, but may be an odd-numbered column in the context of the array substrate. In another example, the (4k-2)-th column is an even-numbered column in the context of the K columns, and also an even-numbered column in the context of the array substrate. In one example, the (4k-1)-th column is an odd-numbered column in the context of the K columns, but may be an even-numbered column in the context of the array substrate. In another example, the (4k-1)-th column is an odd-numbered column in the context of the K columns, and also an odd-numbered column in the context of the array substrate. In one example, the (4k)-th column is an even-numbered column in the context of the K columns, but may be an odd-numbered column in the context of the array substrate. In another example, the (4k)-th column is an even-numbered column in the context of the K columns, and also an even-numbered column in the context of the array substrate.

As used herein, the term "(2m-1)-th row" and the term "(2m)-th row" are used in the context of the M rows. The array substrate may or may not include additional row(s) before the first row of the M rows and/or additional rows after the last row of the M rows. In the context of the array substrate, the term "(2m-1)-th row" does not necessarily denote an odd-numbered row, and the term "(2m)-th row does not necessarily denote an even-numbered row. In one example, the (2m-1)-th row is an odd-numbered row in the context of the M rows, but may be an even-numbered row in the context of the array substrate. In another example, the (2m-1)-th row is an odd-numbered row in the context of the M rows, and also an odd-numbered row in the context of the array substrate. In one example, the (2m)-th row is an even-numbered row in the context of the M rows, but may be an odd-numbered row in the context of the array substrate. In another example, the (2m)-th row is an even-numbered row in the context of the M rows, and also an even-numbered row in the context of the array substrate.

In some embodiments, a first adjacent third reset signal line Vint3-1 of the plurality of third reset signal lines is configured to provide reset signals to first electrodes of first transistors respectively in two adjacent pixel driving circuits in a (2m-1)-th row R(2m-1) of pixel driving circuits, and in a (4k-3)-th column C(4k-3) and a (4k-2)-th column C(4k-2) of pixel driving circuits, respectively; a first adjacent fourth reset signal line Vint4-1 of the plurality of fourth reset signal lines is configured to provide reset signals to first electrodes of sixth transistors respectively in the two adjacent pixel driving circuits in the (2m-1)-th row R(2m-1) of pixel driving circuits, and in the (4k-3)-th column C(4k-3) and the (4k-2)-th column C(4k-2) of pixel driving circuits, respectively. Optionally, the first adjacent third reset signal line Vint3-1 at least partially extends in (e.g., extends through) the (4k-3)-th column C(4k-3) of pixel driving circuits; and the first adjacent fourth reset signal line Vint4-1 at least partially extends in (e.g., extends through) the (4k-2)-th column C(4k-2) of pixel driving circuits. Optionally, adjacent columns are spaced apart by a first voltage supply line of the plurality of first voltage supply lines Vdd1 or a second voltage supply line of the plurality of second voltage supply lines Vdd2.

In some embodiments, a second adjacent third reset signal line Vint3-2 of the plurality of third reset signal lines is configured to provide reset signals to first electrodes of first transistors respectively in two adjacent pixel driving circuits in the (2m-1)-th row R(2m-1) of pixel driving circuits, and in a (4k-1)-th column C(4k-1) and a (4k)-th column C(4k) of pixel driving circuits, respectively; a second adjacent fourth reset signal line Vint4-2 of the plurality of fourth reset signal lines is configured to provide reset signals to first electrodes of sixth transistors respectively in the two adjacent pixel driving circuits in the (2m-1)-th row R(2m-1) of pixel driving circuits, and in the (4k-1)-th column C(4k-1) and the (4k)-th column C(4k) of pixel driving circuits, respectively. Optionally, the second adjacent third reset signal line Vint3-2 at least partially extends in (e.g., extends through) the (4k-1)-th column C(4k-1) of pixel driving circuits; and the second adjacent fourth reset signal line Vint4-2 at least partially extends in (e.g., extends through) the (4k)-th column C(4k) of pixel driving circuits. Optionally, the (4k-3)-th column C(4k-3), the (4k-2)-th column C(4k-2), the (4k-1)-th column C(4k-1), and the (4k)-th column C(4k) are sequentially arranged. Optionally, adjacent columns are spaced apart by a first voltage supply line of the plurality of first voltage supply lines Vdd1 or a second voltage supply line of the plurality of second voltage supply lines Vdd2.

In some embodiments, the second adjacent third reset signal line Vint3-2 of the plurality of third reset signal lines is configured to provide reset signals to first electrodes of first transistors respectively in two adjacent pixel driving circuits in a (2m)-th row R(2) of pixel driving circuits, and in the (4k-2)-th column C(4k-2) and the (4k-1)-th column C(4k-1) of pixel driving circuits, respectively; the first adjacent fourth reset signal line Vint4-1 of the plurality of fourth reset signal lines is configured to provide reset signals to first electrodes of sixth transistors respectively in the two adjacent pixel driving circuits in the (2m)-th row R(2) of pixel driving circuits, and in the (4k-2)-th column C(4k-2) and the (4k-1)-th column C(4k-1) of pixel driving circuits, respectively. Optionally, the (2m-1)-th row R(2m-1) and the (2m)-th row R(2) are sequentially arranged.

Referring to FIG. 3A to FIG. 3I, and FIG. 5, in some embodiments, corresponding layers of pixel driving circuits in the (4k-3)-th column C(4k-3) and the (4k-2)-th column C(4k-2) and corresponding layers of pixel driving circuits in the (4k-1)-th column C(4k-1) and the (4k)-th column C(4) in a same row or in same rows have a substantially mirror symmetry with respect to each other, e.g., about a plane perpendicular to a main surface of the array substrate and substantially parallel to the plurality of data lines DL, or the plurality of first voltage supply lines Vdd1, or the plurality of second voltage supply lines Vdd2.

As used herein, the term "corresponding layers of pixel driving circuits in the (4k-3)-th column C(4k-3) and the (4k-2)-th column C(4k-2) and corresponding layers of pixel driving circuits in the (4k-1)-th column C(4k-1) and the (4k)-th column C(4)" is not intended to include layers that are not parts of the pixel driving circuits. For example, the "corresponding layers of pixel driving circuits in the (4k-3)-th column C(4k-3) and the (4k-2)-th column C(4k-2) and corresponding layers of pixel driving circuits in the (4k-1)-th column C(4k-1) and the (4k)-th column C(4)" do not include an anode layer or a pixel definition layer. In some embodiments, the "corresponding layers of pixel driving circuits in the (4k-3)-th column C(4k-3) and the (4k-2)-th column C(4k-2) and corresponding layers of pixel driving circuits in the (4k-1)-th column C(4k-1) and the (4k)-th column C(4)" do not include a first signal line layer. In one example, the "corresponding layers of pixel driving circuits in the (4k-3)-th column C(4k-3) and the (4k-2)-th column C(4k-2) and corresponding layers of pixel driving circuits in the (4k-1)-th column C(4k-1) and the (4k)-th column C(4)" refer to at least one conductive layer of pixel driving circuits in the (4k-3)-th column C(4k-3), the (4k-2)-th column C(4k-2), the (4k-1)-th column C(4k-1), and the (4k)-th column C(4). In one specific example, "corresponding layers" includes at least one of a first semiconductor material layer, a first gate metal layer, a second gate metal layer, a second semiconductor material layer, a third gate metal layer, a first signal line layer, or a second signal line layer. In another specific example, "corresponding layers" further includes at least one of a gate insulating layer, an insulating layer, a first inter-layer dielectric layer, a second inter-layer dielectric layer, a passivation layer, a first planarization layer, or a second planarization layer. In another specific example, "corresponding layers" includes a first semiconductor material layer, a first gate metal layer, a second gate metal layer, a second semiconductor material layer, a third gate metal layer, a first signal line layer, and a second signal line layer. In another specific example, "corresponding layers" further includes a gate insulating layer, an insulating layer, a first inter-layer dielectric layer, a second inter-layer dielectric layer, a passivation layer, a first planarization layer, and a second planarization layer.

Referring to FIG. 3A, FIG. 3G, and FIG. 5, in some embodiments, the plurality of third voltage supply lines Vint3 are absent in the (4k-2)-th column C(4k-2) and the (4k)-th column C(4); the plurality of fourth voltage supply lines Vint4 are absent in the (4k-3)-th column C(4k-3) and the (4k-1)-th column C(4k-1). Optionally, the plurality of third voltage supply lines Vint3 are present in the (4k-3)-th column C(4k-3) and the (4k-1)-th column C(4k-1); and the plurality of fourth voltage supply lines Vint4 are present in the (4k-2)-th column C(4k-2) and the (4k)-th column C(4).

Figure 6:
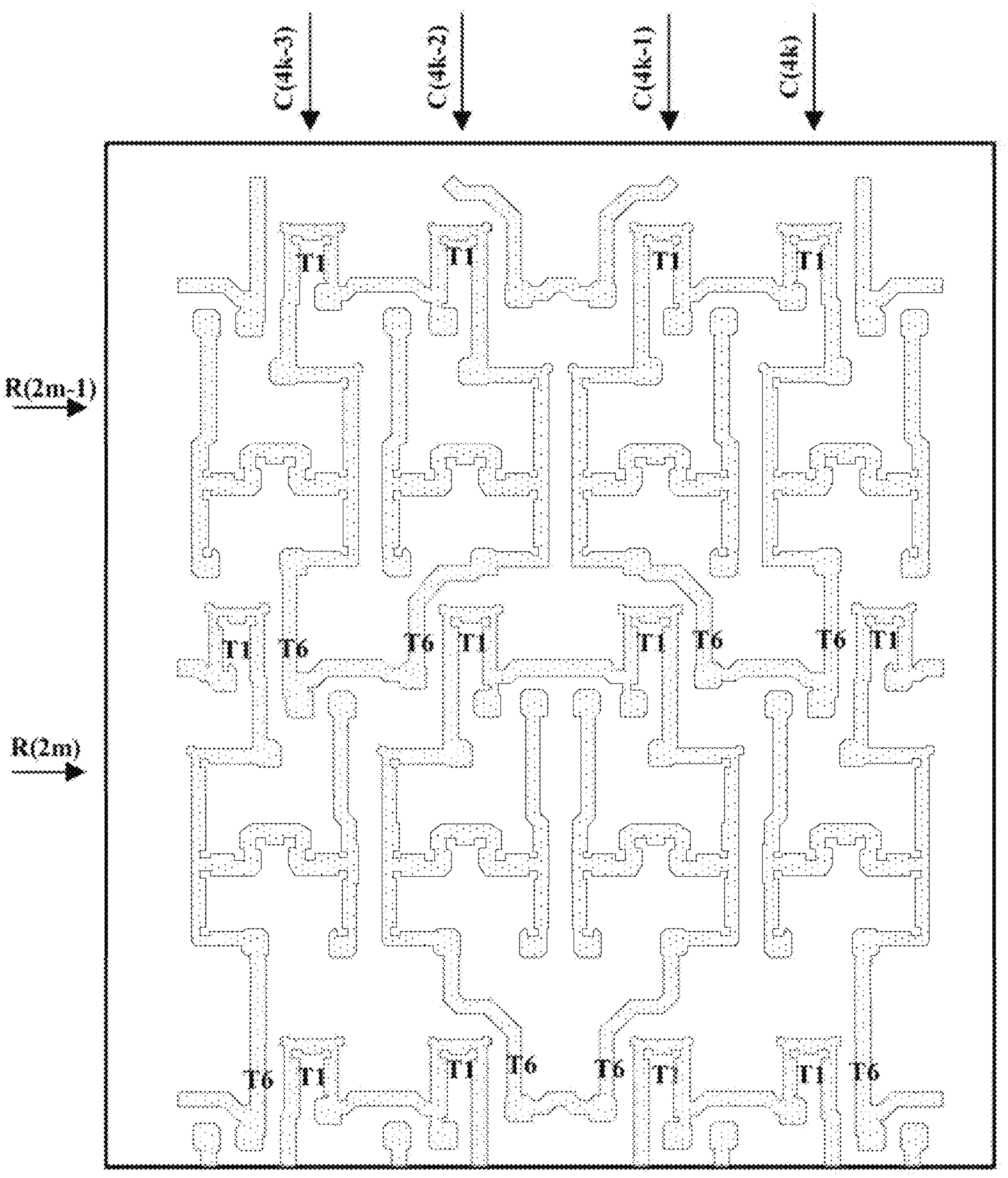
FIG. 6 is a diagram illustrating the structure of a semiconductor material layer in the portion of the array substrate depicted in FIG. 3A.

FIG. 6 is a diagram illustrating the structure of a semiconductor material layer in the portion of the array substrate depicted in FIG. 3A. Referring to FIG. 3A, FIG. 3C, FIG. 5, and FIG. 6, in some embodiments, first electrodes of first transistors in two adjacent pixel driving circuits in the (2m-1)-th row R(2m-1) and in the (4k-3)-th column C(4k-3) and the (4k-2)-th column C(4k-2), respectively, are parts of a first unitary structure. In some embodiments, first electrodes of sixth transistors in two adjacent pixel driving circuits in the (2m-1)-th row R(2m-1) and in the (4k-3)-th column C(4k-3) and the (4k-2)-th column C(4k-2), respectively, are parts of the first unitary structure. Optionally, active layers, at least portions of first electrodes; and at least portion of second electrodes of transistors of the two adjacent pixel driving circuits in the (2m-1)-th row R(2m-1) and in the (4k-3)-th column C(4k-3) and the (4k-2)-th column C(4k-2), respectively, are parts of the first unitary structure. The inventors of the present disclosure discover that, by having the first unitary structure comprising the first electrodes of first transistors in two adjacent pixel driving circuits, only one via is needed for connecting a reset signal line with the first electrodes of first transistors in two adjacent pixel driving circuits. This intricate structure is conducive to saving layout space, and reducing cross-talk between adjacent subpixels.

In some embodiments, first electrodes of first transistors in two adjacent pixel driving circuits in the (2m-1)-th row R(2m-1) and in the (4k-1)-th column C(4k-1) and the (4k)-th column C(4), respectively, are parts of a second unitary structure. In some embodiments, first electrodes of sixth transistors in two adjacent pixel driving circuits in the (2m-1)-th row R(2m-1) and in the (4k-1)-th column C(4k-1) and the (4k)-th column C(4), respectively, are parts of the second unitary structure. Optionally, active layers, at least portions of first electrodes, and at least portion of second electrodes of transistors of the two adjacent pixel driving circuits in the (2m-1)-th row R(2m-1) and in the (4k-1)-th column C(4k-1) and the (4k)-th column C(4), respectively, are parts of the second unitary structure. The inventors of the present disclosure discover that, by having the second unitary structure comprising the first electrodes of sixth transistors in two adjacent pixel driving circuits, only one via is needed for connecting a reset signal line with the first electrodes of sixth transistors in two adjacent pixel driving circuits. This intricate structure is conducive to saving layout space, and reducing cross-talk between adjacent subpixels.

In some embodiments, first electrodes of first transistors in two adjacent pixel driving circuits in the (2m)-th row R(2) and in the (4k-2)-th column C(4k-2) and the (4k-1)-th column C(4k-1), respectively, are parts of a third unitary structure. In some embodiments, first electrodes of sixth transistors in two adjacent pixel driving circuits in the (2m)-th row R(2) and in the (4k-2)-th column C(4k-2) and the (4k-1)-th column C(4k-1), respectively, are parts of the third unitary structure. Optionally, active layers, at least portions of first electrodes, and at least portion of second electrodes of transistors of the two adjacent pixel driving circuits in the (2m)-th row R(2) and in the (4k-2)-th column C(4k-2) and the (4k-1)-th column C(4k-1), respectively, are parts of the third unitary structure.

Optionally, the first unitary structure, the second unitary structure, and the third unitary structure are spaced apart from each other.

Referring to FIG. 3A, FIG. 3C, FIG. 5, and FIG. 6, in some embodiments, corresponding components of first transistors in two adjacent pixel driving circuits in a same row and in two adjacent columns have a substantially mirror symmetry, e.g., about a plane perpendicular to a main surface of the array substrate and substantially parallel to the plurality of data lines DL, or the plurality of first voltage supply lines Vdd1, or the plurality of second voltage supply lines Vdd2.

Optionally, corresponding components of first transistors in two adjacent pixel driving circuits in a same row and in the (4k-3)-th column C(4k-3) and the (4k-2)-th column C(4k-2) have a substantially mirror symmetry, e.g., about a first plane perpendicular to a main surface of the array substrate and substantially parallel to the plurality of data lines DL, or the plurality of first voltage supply lines Vdd1, or the plurality of second voltage supply lines Vdd2; corresponding components of first transistors in two adjacent pixel driving circuits in the same row and in the (4k-2)-th column C(4k-2) and the (4k-1)-th column C(4k-1) have a substantially mirror symmetry, e.g., about a second plane perpendicular to the main surface of the array substrate and substantially parallel to the plurality of data lines DL, or the plurality of first voltage supply lines Vdd1, or the plurality of second voltage supply lines Vdd2; and corresponding components of first transistors in two adjacent pixel driving circuits in the same row and in the (4k-1)-th column C(4k-1) and the (4k)-th column C(4) have a substantially mirror symmetry, e.g., about a third plane perpendicular to the main surface of the array substrate and substantially parallel to the plurality of data lines DL, or the plurality of first voltage supply lines Vdd1, or the plurality of second voltage supply lines Vdd2.

In some embodiments, corresponding components of driving transistors, second transistors, third transistors, fourth transistors, or fifth transistors in a same row and in two adjacent columns has a substantial translational symmetry along a row direction.

Optionally, corresponding components of driving transistors, second transistors, third transistors, fourth transistors, or fifth transistors in a same row and in the (4k-3)-th column C(4k-3) and the (4k-2)-th column C(4k-2) have a substantial translational symmetry along a row direction; corresponding components of driving transistors, second transistors, third transistors, fourth transistors, or fifth transistors in the same row and in the (4k-2)-th column C(4k-2) and the (4k-1)-th column C(4k-1) have a substantial translational symmetry along the row direction; and corresponding components of driving transistors, second transistors, third transistors, fourth transistors, or fifth transistors in the same row and in the (4k-1)-th column C(4k-1) and the (4k)-th column C(4) have a substantial translational symmetry along the row direction.

In some embodiments, corresponding components of sixth transistors in two adjacent pixel driving circuits in a same row and in the (4k-2)-th column C(4k-2) and the (4k-1)-th column C(4k-1) have a substantially mirror symmetry, e.g., about a plane perpendicular to a main surface of the array substrate and substantially parallel to the plurality of data lines DL, or the plurality of first voltage supply lines Vdd1, or the plurality of second voltage supply lines Vdd2.

Figure 7:
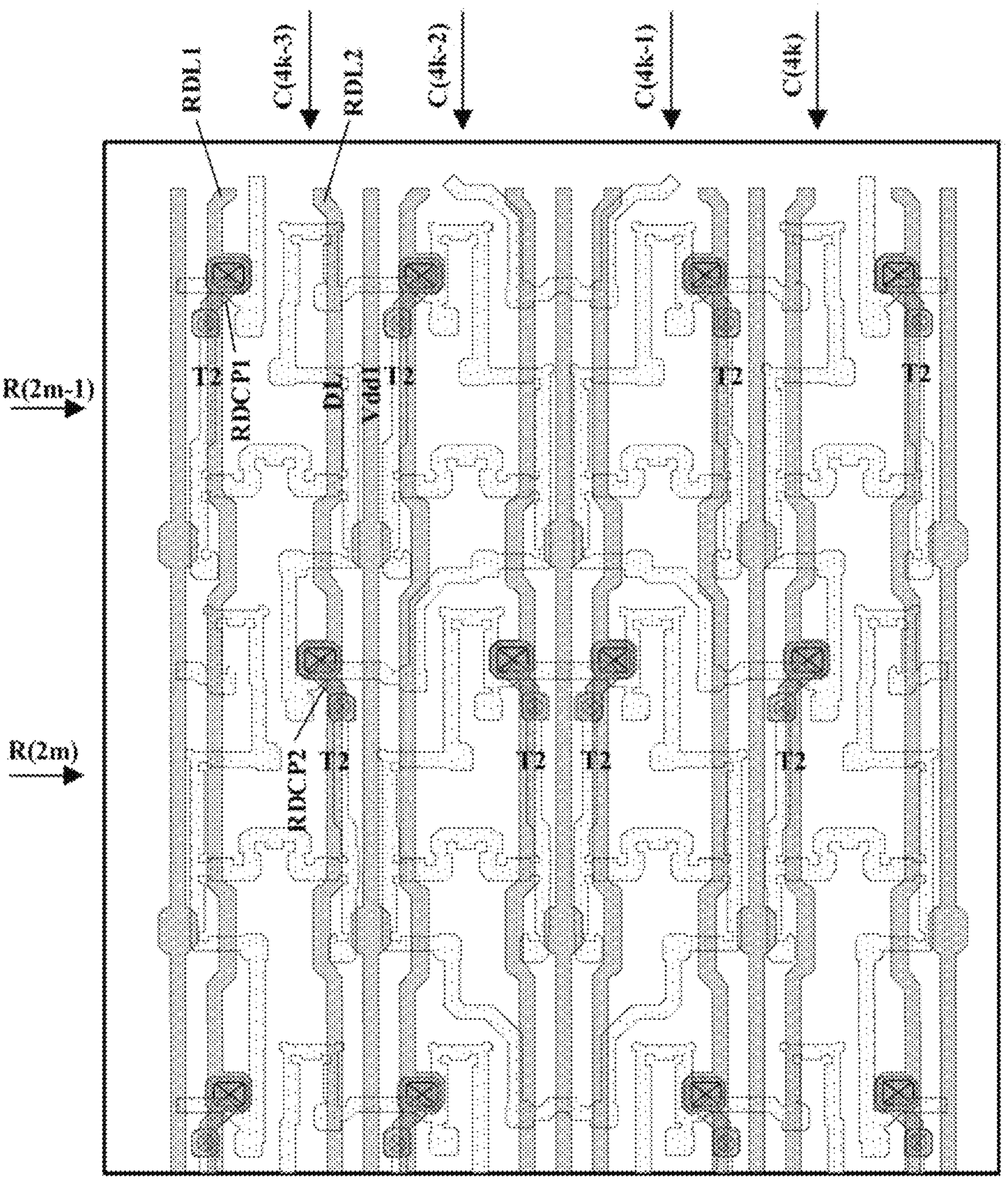
FIG. 7 is a diagram illustrating connection between data lines and corresponding transistors in the array substrate depicted in FIG. 3A.

Optionally, corresponding components of sixth transistors in two adjacent pixel driving circuits in the same row and in the (4k-3)-th column C(4k-3) and the (4k-2)-th column C(4k-2) lack a mirror symmetry; and corresponding components of sixth transistors in two adjacent pixel driving circuits in the same row and in the (4k-1)-th column C(4k-1) and the (4k)-th column C(4) lack a mirror symmetry, FIG. 7 is a diagram illustrating connection between data lines and corresponding transistors in the array substrate depicted in FIG. 3A. Referring to FIG. 3A, FIG. 3C, FIG. 3I, and FIG. 7, in some embodiments, the plurality of data lines DL includes a first respective data line RDL1 configured to provide data signals to first electrodes of second transistors in a same column and in a first row of two adjacent rows of pixel driving circuits; and a second respective data line RDL2 configured to provide data signals to first electrodes of second transistors in the same column and in a second row of the two adjacent rows of pixel driving circuits. The first respective data line RDL1 and the second respective data line RDL2 at least partially extend in (e.g., extend through) the same column. The first respective data line RDL1 is electrically isolated from the first electrodes of the second transistors in the same column and in the second row of the two adjacent rows of pixel driving circuits; and the second respective data line RDL2 is electrically isolated from the first electrodes of the second transistors in the same column and in the first row of the two adjacent rows of pixel driving circuits.

Referring to FIG. 3A, FIG. 3C, FIG. 3I, and FIG. 7, in some embodiments, the plurality of data lines DL includes a first respective data line RDL1 configured to provide data signals to first electrodes of second transistors in a same column and in the (2m-1)-th row R(2m-1) of pixel driving circuits; and a second respective data line RDL2 configured to provide data signals to first electrodes of second transistors in the same column and in the (2m)-th row R(2) of pixel driving circuits. The first respective data line RDL1 and the second respective data line RDL2 at least partially extend in (e.g., extend through) the same column. The first respective data line RDL1 is electrically isolated from the first electrodes of the second transistors in the same column and in the (2m)-th row R(2) of pixel driving circuits; and the second respective data line RDL2 is electrically isolated from the first electrodes of the second transistors in the same column and in the (2m-1)-th row R(2m-1) of pixel driving circuits.

In some embodiments, the first respective data line RDL1 and the second respective data line RDL2 are between two adjacent first voltage supply lines of the plurality of first voltage supply lines Vdd1.

In some embodiments, an orthographic projection of active layers of driving transistors in the same column on a base substrate spaces apart an orthographic projection of the first respective data line RDL1 on the base substrate from an orthographic projection of the second respective data line RDL2 on the base substrate.

In some embodiments, an orthographic projection of a same pixel driving circuit on a base substrate partially overlaps with an orthographic projection of the first respective data line RDL1 on the base substrate, and partially overlaps with an orthographic projection of the second respective data line RDL2 on the base substrate.

In some embodiments, an orthographic projection of a semiconductor layer of a same pixel driving circuit on a base substrate partially overlaps with an orthographic projection of the first respective data line RDL1 on the base substrate, and partially overlaps with an orthographie projection of the second respective data line RDL2 on the base substrate.

In some embodiments, an orthographic projection of the first respective data line RDL1 on a base substrate partially overlaps with a first electrode of a driving transistor on the base substrate; and an orthographic projection of the second respective data line RDL2 on the base substrate partially overlaps with a second electrode of the driving transistor on the base substrate.

In some embodiments, the array substrate includes a plurality of first data signal connecting pads and a plurality of second data signal connecting pads in the same column of pixel driving circuits. A respective first data signal connecting pad RDCP1 connects the first respective data line RDL1 with a first electrode of a second transistor in a first respective pixel driving circuit in the first row of the two adjacent rows of pixel driving circuits. A respective second data signal connecting pad RDCP2 connects the second respective data line RDL2 with a first electrode of a second transistor in a second respective pixel driving circuit in the second row of the two adjacent rows of pixel driving circuits. The plurality of first data signal connecting pads are absent in the first row of the two adjacent rows of pixel driving circuits. The plurality of second data signal connecting pads are absent in the second row of the two adjacent rows of pixel driving circuits.

In some embodiments, the array substrate includes a plurality of first data signal connecting pads and a plurality of second data signal connecting pads in the same column of pixel driving circuits. A respective first data signal connecting pad RDCP1 connects the first respective data line RDL1 with a first electrode of a second transistor in a first respective pixel driving circuit in the (2m-1)-th row R(2m-1). A respective second data signal connecting pad RDCP2 connects the second respective data line RDL2 with a first electrode of a second transistor in a second respective pixel driving circuit in the (2m)-th row R(2). The plurality of first data signal connecting pads are absent in the (2m)-th row R(2). The plurality of second data signal connecting pads are absent in the (2m-1)-th row R(2m-1).

In some embodiments, a ratio of a total number of data lines to a total number of columns of pixel driving circuits in the array substrate is in a range of 1.6:1 to 2.4:1, e.g., 1.6:1 to 1.7:1, 1.7:1 to 1.8:1, 1.8:1 to 1.9:1, 1.9:1 to 2.0:1, 2.0:1 to 2.1:1, 2.1:1 to 2.2:1, 2.2:1 to 2.3:1, or 2.3:1 to 2.4:1. In one example, the ratio of the total number of data lines to the total number of columns of pixel driving circuits in the array substrate is 2:1.

In some embodiments, a ratio of a total number of data signal connecting pads to a total number of pixel driving circuits in the array substrate is in a range of 0.8:1 to 1.2:1, e.g., 0.8:1 to 0.9:1, 0.9:1 to 1.0:1, 1.0:1 to 1.1:1, or 1.1:1 to 1.2:1, In one example, the ratio of the total number of data signal connecting pads to the total number of pixel driving circuits in the array substrate is 1:1.

Figure 8:
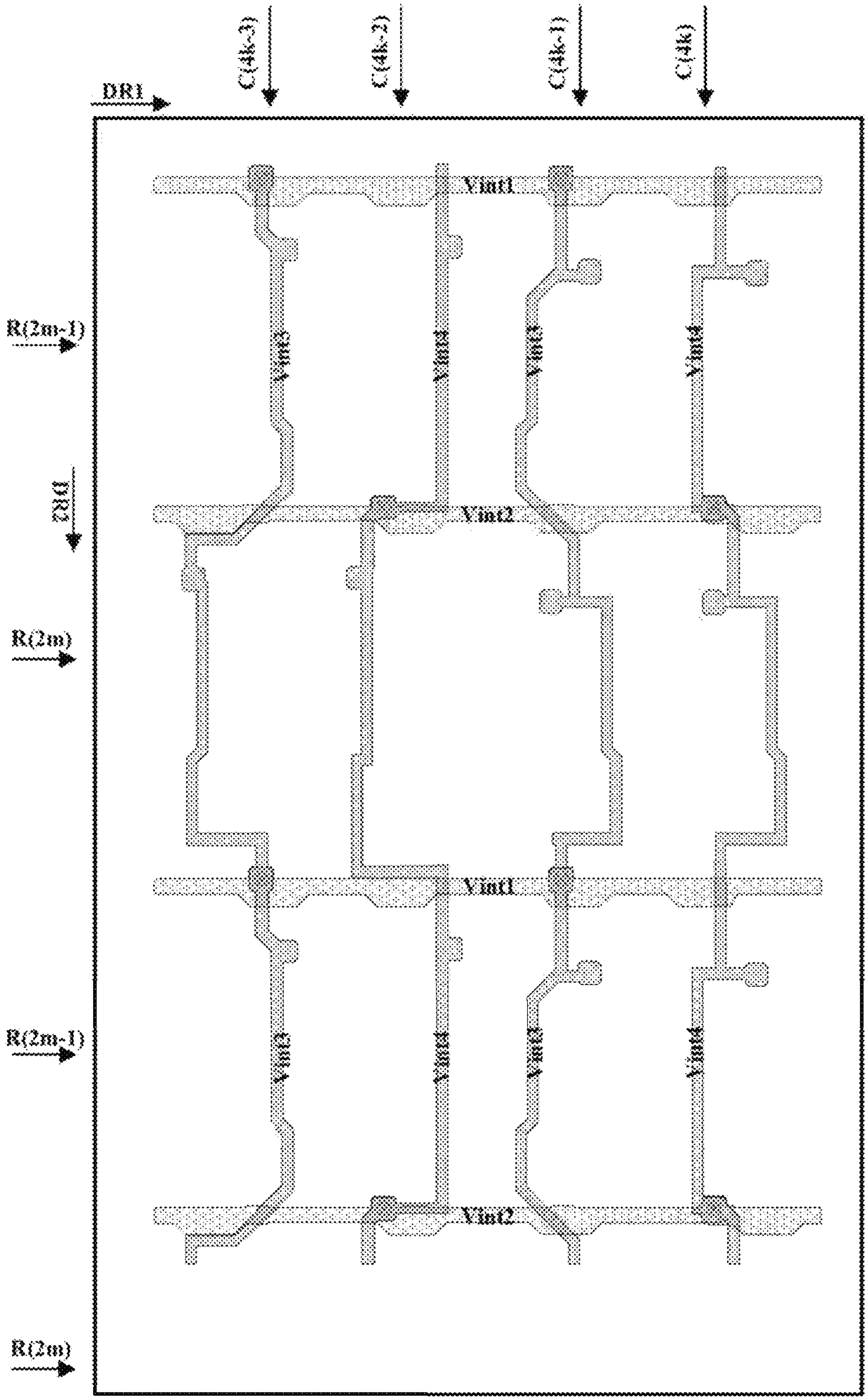
FIG. 8 is a diagram illustrating the structure of a first reset signal network and a second reset signal network in an array substrate in some embodiments according to the present disclosure.

FIG. 8 is a diagram illustrating the structure of a first reset signal network and a second reset signal network in an array substrate in some embodiments according to the present disclosure. Referring to FIG. 8, the first reset signal network in some embodiments includes a plurality of first reset signal lines Vint1 and a plurality of third reset signal lines Vint3 interconnected to each other. Optionally, the plurality of first reset signal lines Vint1 extend along a direction substantially parallel to a first direction DR1. Optionally, the plurality of third reset signal lines Vint3 extend along a direction substantially parallel to a second direction DR2. Optionally, a respective first reset signal line of the plurality of first reset signal lines Vint1 is connected to one or more third reset signal lines of the plurality of third reset signal lines Vint3. Optionally, a respective third reset signal line of the plurality of third reset signal lines Vint3 is connected to one or more first reset signal lines of the plurality of first reset signal lines Vint1.

In one example, the plurality of first reset signal lines Vint1 are in the second conductive layer. Optionally, the plurality of third reset signal lines Vint3 are in the first signal line layer.

Referring to FIG. 8, the second reset signal network in some embodiments includes a plurality of second reset signal lines Vint2 and a plurality of fourth reset signal lines Vint4 interconnected to each other. Optionally, the plurality of second reset signal lines Vint2 extend along a direction substantially parallel to a first direction DR1. Optionally, the plurality of fourth reset signal lines Vint4 extend along a direction substantially parallel to a second direction DR2. Optionally, a respective second reset signal line of the plurality of second reset signal lines Vint2 is connected to one or more fourth reset signal lines of the plurality of fourth reset signal lines Vint4. Optionally, a respective fourth reset signal line of the plurality of fourth reset signal lines Vint4 is connected to one or more second reset signal lines of the plurality of second reset signal lines Vint2.

In one example, the plurality of second reset signal lines Vint2 are in the first signal line layer. Optionally, the plurality of fourth reset signal lines Vint4 are in the first signal line layer.

In some embodiments, the plurality of third reset signal lines Vint3 are absent in the (4k-2)-th column C(4k-2) and in the (4k)-th column C(4); the plurality of fourth reset signal lines Vint4 are absent in the (4k-3)-th column C(4k-3) and in the (4k-1)-th column C(4k-1). In some embodiments, the plurality of first reset signal lines Vint1 are absent in the (2m)-th row R(2); the plurality of second reset signal lines Vint2 are absent in the (2m-1)-th row R(2m-1).

In some embodiments, a respective first reset signal line of the plurality of first reset signal lines Vint1 in the (2m-1)-th row R(2m-1) is connected to one or more third reset signal lines of the plurality of third reset signal lines Vint3 in the (4k-3)-th column C(4k-3) or in the (4k-1)-th column C(4k-1). Optionally, a respective third reset signal line of the plurality of third reset signal lines Vint3 in the (4k-3)-th column C(4k-3) or in the (4k-1)-th column C(4k-1) is connected to one or more first reset signal lines of the plurality of first reset signal lines Vint1 in the (2m-1)-th row R(2m-1).

In some embodiments, a respective second reset signal line of the plurality of second reset signal lines Vint2 in the (2m)-th row R(2) is connected to one or more fourth reset signal lines of the plurality of fourth reset signal lines Vint4 in the (4k-2)-th column C(4k-2) or in the (4k)-th column C(4), Optionally, a respective fourth reset signal line of the plurality of fourth reset signal lines Vint4 in the (4k-2)-th column C(4k-2) or in the (4k)-th column C(4) is connected to one or more second reset signal lines of the plurality of second reset signal lines Vint2 in the (2m)-th row R(2).

The inventors of the present disclosure discover that, by having the first reset signal network and the second reset signal network according to the present disclosure, a high-resolution display and high display quality can be achieved.

Figure 9:
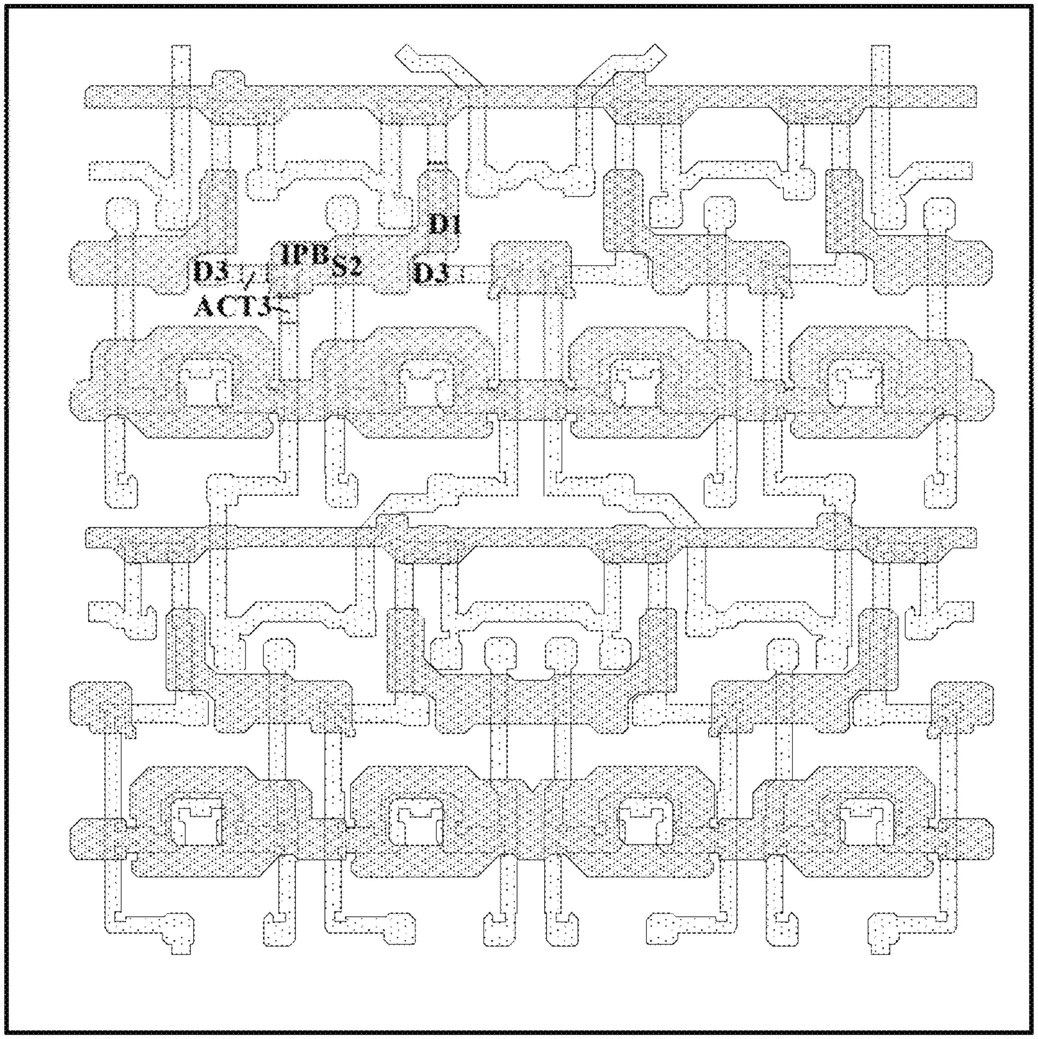
FIG. 9 is a diagram illustrating a layout of signal lines in a semiconductor material layer and a second conductive layer in a portion of an array substrate in some embodiments according to the present disclosure.

FIG. 9 is a diagram illustrating a layout of signal lines in a semiconductor material layer and a second conductive layer in a portion of an array substrate in some embodiments according to the present disclosure. Referring to FIG. 3A to FIG. 3I, and FIG. 9, the array substrate in some embodiments further includes an interference prevention block IPB. Optionally, the interference prevention block IPB is in the second conductive layer. Optionally, the interference prevention block IPB is in a same layer as the second capacitor electrode Ce2. Optionally, the interference prevention block IPB is connected to a respective second voltage supply line of the plurality of second voltage supply lines Vdd2. Optionally, the interference prevention block IPB is configured to receive a first reference voltage signal. Optionally, the first reference voltage signal is a constant voltage signal, e.g., a high reference voltage signal.

In some embodiments, an orthographic projection of the interference prevention block IPB on a base substrate at least partially overlaps with an orthographic projection of a portion of the semiconductor material layer between two active layer portions (e.g., two channel parts) of the third transistor T3 on the base substrate. The inventors of the present disclosure discover that this unique structure enhances stability of the third transistor T3.

Figure 10:
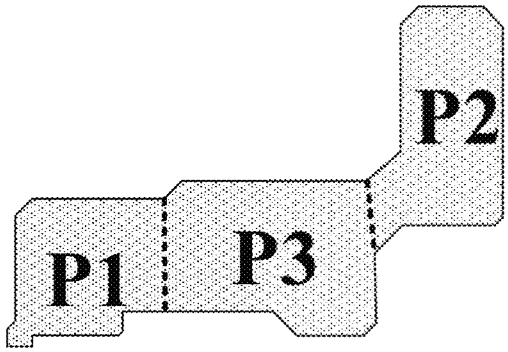
FIG. 10 is a diagram illustrating the structure of an interference prevention block in some embodiments according to the present disclosure.

FIG. 10 is a diagram illustrating the structure of an interference prevention block in some embodiments according to the present disclosure. Referring to FIG. 10, the interference prevention block IPB in some embodiments includes a first portion P1 and a second portion P2. In some embodiments, an orthographic projection of the first portion P1 on a base substrate at least partially overlaps with an orthographic projection of a portion of the semiconductor material layer between two active layer portions (e.g., two channel parts) of the third transistor T3 in a first adjacent pixel driving circuit on the base substrate. In some embodiments, an orthographic projection of the second portion P2 on a base substrate at least partially overlaps with an orthographic projection of a second electrode D1 of a first transistor and/or a second electrode D3 of a third transistor in a second adjacent pixel driving circuit on the base substrate. Optionally, the first adjacent pixel driving circuit and the second adjacent pixel driving circuit are in a same row and are adjacent to each other.

In some embodiments, the interference prevention block IPB further includes a third portion P3 connecting the first portion P1 with the second portion P2. In some embodiments, an orthographic projection of the third portion P3 on a base substrate at least partially overlaps with an orthographic projection of a first electrode S2 of a second transistor in the second adjacent pixel driving circuit on the base substrate.

In another aspect, the present invention provides a display apparatus, including the array substrate described herein or fabricated by a method described herein, and one or more integrated circuits connected to the array substrate. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus.

In another aspect, the present disclosure provides a method of fabricating an array substrate. In some embodiments, the method includes forming a plurality of data lines. Optionally, forming the plurality of data lines includes forming a first respective data line configured to provide data signals to first electrodes of data write transistors in a same column of pixel driving circuits and in a first row of two adjacent rows of pixel driving circuits; and forming a second respective data line configured to provide data signals to first electrodes of data write transistors in the same column of pixel driving circuits and in a second row of the two adjacent rows of pixel driving circuits. Optionally, the first respective data line and the second respective data line at least partially extend in the same column. Optionally, the first respective data line is electrically isolated from the first electrodes of the data write transistors in the same column of pixel driving circuits and in the second row of the two adjacent rows of pixel driving circuits. Optionally, the second respective data line is electrically isolated from the first electrodes of the data write transistors in the same column of pixel driving circuits and in the first row of the two adjacent rows of pixel driving circuits.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An array substrate, comprising a plurality of data lines, a plurality of third reset signal lines, and a plurality of fourth reset signal lines;

wherein the plurality of data lines comprise a first respective data line configured to provide data signals to first electrodes of data write transistors in a same column of pixel driving circuits and in a first row of two adjacent rows of pixel driving circuits; and a second respective data line configured to provide data signals to first electrodes of data write transistors in the same column of pixel driving circuits and in a second row of the two adjacent rows of pixel driving circuits;

the first respective data line and the second respective data line at least partially extend in the same column;

the first respective data line is electrically isolated from the first electrodes of the data write transistors in the same column of pixel driving circuits and in the second row of the two adjacent rows of pixel driving circuits; and the second respective data line is electrically isolated from the first electrodes of the data write transistors in the same column of pixel driving circuits and in the first row of the two adjacent rows of pixel driving circuits;

wherein a first adjacent third reset signal line of the plurality of third reset signal lines is configured to provide reset signals to first electrodes of first reset transistors respectively in two adjacent pixel driving circuits in a first row of two adjacent rows of pixel driving circuits, and in a first column and a second column of two adjacent columns of pixel driving circuits, respectively;

a first adjacent fourth reset signal line of the plurality of fourth reset signal lines is configured to provide reset signals to first electrodes of second reset transistors respectively in the two adjacent pixel driving circuits in the first row of two adjacent rows of pixel driving circuits, and in the first column and the second column of the two adjacent columns of pixel driving circuits, respectively;

a second adjacent third reset signal line of the plurality of third reset signal lines is configured to provide reset signals to first electrodes of first reset transistors respectively in two adjacent pixel driving circuits in the first row of the two adjacent rows of pixel driving circuits, and in a third column and a fourth column of two adjacent columns of pixel driving circuits, respectively;

a second adjacent fourth reset signal line of the plurality of fourth reset signal lines is configured to provide reset signals to first electrodes of second reset transistors respectively in the two adjacent pixel driving circuits in the first row of the two adjacent rows of pixel driving circuits, and in the third column and the fourth column of the two adjacent columns of pixel driving circuits, respectively;

the second adjacent third reset signal line of the plurality of third reset signal lines is configured to provide reset signals to first electrodes of first reset transistors respectively in two adjacent pixel driving circuits in a second row of the two adjacent rows of pixel driving circuits, and in the second column and the third column of two adjacent columns of pixel driving circuits, respectively; and the first adjacent fourth reset signal line of the plurality of fourth reset signal lines is configured to provide reset signals to first electrodes of second reset transistors respectively in the two adjacent pixel driving circuits in the second row of two adjacent rows of pixel driving circuits, and in the second column and the third column of the two adjacent columns of pixel driving circuits, respectively.

2. The array substrate of claim 1, wherein an orthographic projection of a same pixel driving circuit on a base substrate partially overlaps with an orthographic projection of the first respective data line on the base substrate, and partially overlaps with an orthographic projection of the second respective data line on the base substrate.

3. The array substrate of claim 1, wherein an orthographic projection of the first respective data line on a base substrate partially overlaps with an orthographic projection of a first electrode of a driving transistor on the base substrate; and an orthographic projection of the second respective data line on the base substrate partially overlaps with an orthographic projection of a second electrode of the driving transistor on the base substrate.

4. The array substrate of claim 1, further comprising a plurality of first data signal connecting pads and a plurality of second data signal connecting pads in the same column of pixel driving circuits;

a respective first data signal connecting pad of the plurality of first data signal connecting pads connects the first respective data line with a first electrode of a data write transistor in a first respective pixel driving circuit in the first row of the two adjacent rows of pixel driving circuits;

a respective second data signal connecting pad of the plurality of second data signal connecting pads connects the second respective data line with a first electrode of a data write transistor in a second respective pixel driving circuit in the second row of the two adjacent rows of pixel driving circuits;

the plurality of first data signal connecting pads are absent in the second row of the two adjacent rows of pixel driving circuits; and the plurality of second data signal connecting pads are absent in the first row of the two adjacent rows of pixel driving circuits.

5. The array substrate of claim 1, wherein a ratio of a total number of data lines to a total number of columns of pixel driving circuits in the array substrate is in a range of 1.6:1 to 2.4:1.

6. The array substrate of claim 1, wherein the first adjacent third reset signal line at least partially extends in the first column of the two adjacent columns of pixel driving circuits;

the first adjacent fourth reset signal line at least partially extends in the second column of the two adjacent columns of pixel driving circuits;

the second adjacent third reset signal line at least partially extends in the third column of the two adjacent columns of pixel driving circuits;

the second adjacent fourth reset signal line at least partially extends in the fourth column of the two adjacent columns of pixel driving circuits;

the first column, the second column, the third column, and the fourth column are sequentially arranged; and the first row and the second row are sequentially arranged.

7. A display apparatus, comprising the array substrate of claim 1, and one or more integrated circuits connected to the array substrate.

8. An array substrate, comprising a plurality of data lines, and pixel driving circuits arranged in K number of columns and M number of rows, K and M being positive integers;

wherein the plurality of data lines comprise a first respective data line configured to provide data signals to first electrodes of data write transistors in a same column of pixel driving circuits and in a first row of two adjacent rows of pixel driving circuits; and a second respective data line configured to provide data signals to first electrodes of data write transistors in the same column of pixel driving circuits and in a second row of the two adjacent rows of pixel driving circuits;

the first respective data line and the second respective data line at least partially extend in the same column;

the first respective data line is electrically isolated from the first electrodes of the data write transistors in the same column of pixel driving circuits and in the second row of the two adjacent rows of pixel driving circuits; and the second respective data line is electrically isolated from the first electrodes of the data write transistors in the same column of pixel driving circuits and in the first row of the two adjacent rows of pixel driving circuits;

the array substrate includes K number of reset signal lines configured to provide reset signals to reset transistors in the array substrate;

the K number of columns comprise a (4k-3)-th column of the K columns, a (4k-2)-th column of the K columns, a (4k-1)-th column of the K columns, and a 4k-th column of the K columns, k being a positive integer, $1 \leq k \leq (K/4)$;

the M number of rows comprise a (2m-1)-th row of the M rows, and a 2m-th row of the M rows, m being a positive integer, $1 \leq m \leq (M/2)$; and the K number of reset signal lines comprise a plurality of third reset signal lines in the (4k-3)-th column of the K columns, or in the (4k-1)-th column of the K columns;

and a plurality of fourth reset signal lines in the (4k-2)-th column of the K columns, or in the 4k-th column of the K columns.

9. The array substrate of claim 8, wherein the K number of reset signal lines comprise:

a first adjacent third reset signal line of the plurality of third reset signal lines configured to provide reset signals to first electrodes of first reset transistors respectively in two adjacent pixel driving circuits in the (2m-1)-th row of pixel driving circuits, and in the (4k-3)-th column and the (4k-2)-th column of pixel driving circuits, respectively;

a first adjacent fourth reset signal line of the plurality of fourth reset signal lines configured to provide reset signals to first electrodes of second reset transistors respectively in the two adjacent pixel driving circuits in the (2m-1)-th row of pixel driving circuits, and in the (4k-3)-th column and the (4k-2)-th column of pixel driving circuits, respectively;

a second adjacent third reset signal line of the plurality of third reset signal lines configured to provide reset signals to first electrodes of first reset transistors respectively in two adjacent pixel driving circuits in the (2m-1)-th row of pixel driving circuits, and in a (4k-1)-th column and a (4k)-th column of pixel driving circuits, respectively; and a second adjacent fourth reset signal line of the plurality of fourth reset signal lines configured to provide reset signals to first electrodes of second reset transistors respectively in the two adjacent pixel driving circuits in the (2m-1)-th row of pixel driving circuits, and in the (4k-1)-th column and the (4k)-th column of pixel driving circuits, respectively;

wherein the second adjacent third reset signal line is configured to provide reset signals to first electrodes of first reset transistors respectively in two adjacent pixel driving circuits in a (2m)-th row of pixel driving circuits, and in the (4k-2)-th column and the (4k-1)-th column of pixel driving circuits, respectively; and the first adjacent fourth reset signal line is configured to provide reset signals to first electrodes of second reset transistors respectively in the two adjacent pixel driving circuits in the (2m)-th row of pixel driving circuits, and in the (4k-2)-th column and the (4k-1)-th column of pixel driving circuits, respectively.

10. The array substrate of claim 8, wherein the first adjacent third reset signal line at least partially extends in the (4k-3)-th column of pixel driving circuits;

the first adjacent fourth reset signal line at least partially extends in the (4k-2)-th column of pixel driving circuits;

the second adjacent third reset signal line at least partially extends in the (4k-1)-th column of pixel driving circuits; and the second adjacent fourth reset signal line at least partially extends in the (4k)-th column of pixel driving circuits.

11. The array substrate of claim 8, wherein the plurality of third voltage supply lines are absent in the (4k-2)-th column and the (4k)-th column;

the plurality of fourth voltage supply lines are absent in the (4k-3)-th column and the (4k-1)-th column;

the plurality of third voltage supply lines are present in the (4k-3)-th column or in the (4k-1)-th column; and the plurality of fourth voltage supply lines are present in the (4k-2)-th column or in the (4k)-th column.

12. The array substrate of claim 8, wherein at least one corresponding layer of pixel driving circuits in the (4k-3)-th column and the (4k-2)-th column and at least one corresponding layer of pixel driving circuits in the (4k-1)-th column and the (4k)-th column in a same row or in same rows have a substantially mirror symmetry with respect to each other.

13. The array substrate of claim 8, wherein first electrodes of first reset transistors in two adjacent pixel driving circuits in the (2m-1)-th row and in the (4k-3)-th column and the (4k-2)-th column, respectively, are parts of a first unitary structure;

first electrodes of second reset transistors in the two adjacent pixel driving circuits in the (2m-1)-th row and in the (4k-3)-th column and the (4k-2)-th column, respectively, are parts of the first unitary structure;

first electrodes of first reset transistors in two adjacent pixel driving circuits in the (2m-1)-th row and in the (4k-1)-th column and the (4k)-th column, respectively, are parts of a second unitary structure;

first electrodes of second reset transistors in the two adjacent pixel driving circuits in the (2m-1)-th row and in the (4k-1)-th column and the (4k)-th column, respectively, are parts of the second unitary structure;

first electrodes of first reset transistors in two adjacent pixel driving circuits in the (2m)-th row and in the (4k-2)-th column and the (4k-1)-th column, respectively, are parts of a third unitary structure; and first electrodes of second reset transistors in the two adjacent pixel driving circuits in the (2m)-th row and in the (4k-2)-th column and the (4k-1)-th column, respectively, are parts of the third unitary structure.

14. The array substrate of claim 8, wherein active layers, at least portions of first electrodes, and at least portion of second electrodes of transistors of the two adjacent pixel driving circuits in the (2m-1)-th row and in the (4k-3)-th column and the (4k-2)-th column, respectively, are parts of a first unitary structure;

active layers, at least portions of first electrodes, and at least portion of second electrodes of transistors of the two adjacent pixel driving circuits in the (2m-1)-th row and in the (4k-1)-th column and the (4k)-th column, respectively, are parts of a second unitary structure; and active layers, at least portions of first electrodes, and at least portion of second electrodes of transistors of the two adjacent pixel driving circuits in the (2m)-th row and in the (4k-2)-th column and the (4k-1)-th column, respectively, are parts of a third unitary structure.

15. The array substrate of claim 8, wherein corresponding components of first reset transistors in two adjacent pixel driving circuits in a same row and in the (4k-3)-th column and the (4k-2)-th column have a substantially mirror symmetry;

corresponding components of first reset transistors in two adjacent pixel driving circuits in the same row and in the (4k-2)-th column and the (4k-1)-th column have a substantially mirror symmetry;

corresponding components of first reset transistors in two adjacent pixel driving circuits in the same row and in the (4k-1)-th column and the (4k)-th column have a substantially mirror symmetry; and corresponding components of second reset transistors in two adjacent pixel driving circuits in a same row and in the (4k-2)-th column and the (4k-1)-th column have a substantially mirror symmetry.

16. The array substrate of claim 15, wherein corresponding components of sixth transistors in two adjacent pixel driving circuits in the same row and in the (4k-3)-th column and the (4k-2)-th column lack a mirror symmetry; and corresponding components of sixth transistors in two adjacent pixel driving circuits in the same row and in the (4k-1)-th column and the (4k)-th column lack a mirror symmetry.

17. An array substrate, comprising a plurality of data lines, a first reset signal network, and a second reset signal network;

wherein the plurality of data lines comprise a first respective data line configured to provide data signals to first electrodes of data write transistors in a same column of pixel driving circuits and in a first row of two adjacent rows of pixel driving circuits; and a second respective data line configured to provide data signals to first electrodes of data write transistors in the same column of pixel driving circuits and in a second row of the two adjacent rows of pixel driving circuits;

the first respective data line and the second respective data line at least partially extend in the same column;

the first respective data line is electrically isolated from the first electrodes of the data write transistors in the same column of pixel driving circuits and in the second row of the two adjacent rows of pixel driving circuits; and the second respective data line is electrically isolated from the first electrodes of the data write transistors in the same column of pixel driving circuits and in the first row of the two adjacent rows of pixel driving circuits;

wherein the first reset signal network comprises a plurality of first reset signal lines and a plurality of third reset signal lines interconnected to each other;

the second reset signal network comprises a plurality of second reset signal lines and a plurality of fourth reset signal lines interconnected to each other;

a respective first reset signal line of the plurality of first reset signal lines is connected to one or more third reset signal lines of the plurality of third reset signal lines;

a respective third reset signal line of the plurality of third reset signal lines is connected to one or more first reset signal lines of the plurality of first reset signal lines;

a respective second reset signal line of the plurality of second reset signal lines is connected to one or more fourth reset signal lines of the plurality of fourth reset signal lines; and a respective fourth reset signal line of the plurality of fourth reset signal lines is connected to one or more second reset signal lines of the plurality of second reset signal lines.

18. The array substrate of claim 17, further comprising pixel driving circuits arranged in K number of columns and M number of rows, K and M being positive integers;

the K number of columns comprise a (4k-3)-th column of the K columns, a (4k-2)-th column of the K columns, a (4k-1)-th column of the K columns, and a 4k-th column of the K columns, k being a positive integer, $1 \leq k \leq (K/4)$;

the M number of rows comprise a (2m-1)-th row of the M rows, and a 2m-th row of the M rows, m being a positive integer, $1 \leq m \leq (M/2)$;

the plurality of third reset signal lines are absent in the (4k-2)-th column and in the (4k)-th column;

the plurality of fourth reset signal lines are absent in the (4k-3)-th column and in the (4k-1)-th column;

the plurality of first reset signal lines are absent in the (2m)-th row; and the plurality of second reset signal lines are absent in the (2m-1)-th row.

19. The array substrate of claim 18, wherein a respective first reset signal line of the plurality of first reset signal lines in the (2m-1)-th row is connected to one or more third reset signal lines of the plurality of third reset signal lines in the (4k-3)-th column or in the (4k-1)-th column;

a respective third reset signal line of the plurality of third reset signal lines in the (4k-3)-th column or in the (4k-1)-th column is connected to one or more first reset signal lines of the plurality of first reset signal lines in the (2m-1)-th row;

a respective second reset signal line of the plurality of second reset signal lines in the (2m)-th row is connected to one or more fourth reset signal lines of the plurality of fourth reset signal lines in the (4k-2)-th column or in the (4k)-th column; and a respective fourth reset signal line of the plurality of fourth reset signal lines in the (4k-2)-th column or in the (4k)-th column is connected to one or more second reset signal lines of the plurality of second reset signal lines in the (2m)-th row.

* * * * *